US012435880B1

(12) United States Patent
Hedgepeth

(10) Patent No.: US 12,435,880 B1
(45) Date of Patent: Oct. 7, 2025

(54) SAFE COOKING SYSTEM

(71) Applicant: Shaheen Akinitsisahn Hedgepeth, Rocky Mount, NC (US)

(72) Inventor: Shaheen Akinitsisahn Hedgepeth, Rocky Mount, NC (US)

( * ) Notice: Subject to any disclaimer, the term of this patent is extended or adjusted under 35 U.S.C. 154(b) by 0 days.

(21) Appl. No.: 18/944,140

(22) Filed: Nov. 12, 2024

(51) Int. Cl.

| | |
|---|---|
| ***F24C 7/08*** | (2006.01) |
| ***A47J 36/06*** | (2006.01) |
| ***A47J 36/16*** | (2006.01) |
| ***A47J 36/36*** | (2006.01) |
| ***A47J 37/10*** | (2006.01) |
| ***A47J 43/28*** | (2006.01) |
| ***A47J 45/06*** | (2006.01) |
| ***F24C 7/10*** | (2021.01) |
| ***F24C 15/00*** | (2006.01) |
| ***H05B 3/76*** | (2006.01) |

(52) U.S. Cl.
CPC ............... *F24C 7/081* (2013.01); *A47J 36/06* (2013.01); *A47J 36/064* (2022.01); *A47J 36/165* (2013.01); *A47J 36/36* (2013.01); *A47J 37/108* (2013.01); *A47J 43/288* (2013.01); *A47J 45/061* (2013.01); *F24C 7/105* (2013.01); *F24C 15/006* (2013.01); *H05B 3/76* (2013.01)

(58) Field of Classification Search
CPC .................................... H04R 1/06; H04R 9/06
USPC ....................................................... 219/463.1
See application file for complete search history.

(56) References Cited

U.S. PATENT DOCUMENTS

| | | | | |
|---|---|---|---|---|
| 2,601,360 | A | 6/1952 | Blackshear | |
| 3,548,146 | A | 12/1970 | Hoyland | |
| 4,680,167 | A * | 7/1987 | Orlando | G01N 33/28 219/390 |
| 5,422,458 | A * | 6/1995 | Simmel | F24C 7/00 446/481 |
| 6,465,762 | B1 * | 10/2002 | Swayne | A21C 13/00 219/400 |
| 7,282,671 | B1 | 10/2007 | Hamilton | |
| 10,258,193 | B1 | 4/2019 | Reed et al. | |
| 10,863,851 | B1 * | 12/2020 | Ganahl | A47J 27/21175 |
| 11,000,157 | B2 * | 5/2021 | Bassill | A47J 36/2483 |
| 11,548,135 | B1 | 1/2023 | Knaust | |
| 2005/0115077 | A1 | 6/2005 | Rauber | |
| 2021/0235937 | A1 | 8/2021 | Wunderle | |
| 2022/0175190 | A1 | 6/2022 | Hong | |
| 2022/0211209 | A1 | 7/2022 | Jackson | |
| 2022/0354310 | A1 | 11/2022 | Ong, III | |

* cited by examiner

*Primary Examiner* — Steven W Crabb
*Assistant Examiner* — Ket D Dang
(74) *Attorney, Agent, or Firm* — Jennifer R. Knight

(57) ABSTRACT

The present invention provides a safe cooking system. The safe cooking system includes a cooktop with a burner eye with controllers to regulate the intensity of the heat and the length of time the burner eye is turned on, and a cooling eye. Burn guards surround the burner eye and the cooling eye to protect a cook from burns when hot pans are on either eye. Pans are designed to allow for adding ingredients and stirring the contents of a pan without having to remove the lid.

17 Claims, 17 Drawing Sheets

SAFE COOKING SYSTEM

TECHNICAL FIELD

The invention relates to a safe cooking system. More specifically, the invention relates to a safe-cooking cooktop with multiple built-in safety features.

BACKGROUND

Cooking is an inherently dangerous activity due to the elevated temperatures and corresponding risks of burns and/or fires. Most people are capable of cooking independently on commercially available cooking systems, i.e., ranges, stove tops, etc. The risk of injury to a person cooking is higher for children who do not have fully developed brains and limited experience. The risk of injury is also higher for people of any age with a cognitive impairment.

There is a need for a safe cooking system that is usable by children and/or cognitively impaired adults who want to cook. There is a need to protect cooks from burns associated with cooking on a cooktop, such as coming into contract with a hot pan, splashes of liquid when adding ingredients to or stirring ingredients in a pan while cooking, and/or coming into contact with a food item that is being flipped over in a pan. There is also a need to protect against a cook forgetting to turn the burner eye off which can potentially lead to a fire. The inventive safe cooking system addresses these types of needs.

SUMMARY

In one exemplary embodiment, the present disclosure provides a safe-cooking cooktop. The cooktop comprises a cooking eye, a cooling eye, a circuit completer, a first controller and a second controller. The cooking eye and the cooling eye are attached to the top of the cooktop. When the circuit completer is activated, the circuit completer is usable to enable the first controller and the second controller. The first controller is usable to set a heat intensity of the cooking eye, and the second controller is usable to set a time period of the heat intensity. The first controller and the second controller are attached to the cooktop proximal to the cooking eye.

In another embodiment, the present disclosure provides a safe cooking system. The safe cooking system comprises a) a cooktop comprising a cooking eye, a cooling eye, and a circuit completer; b) at least one controller capable of operating the cooking eye and/or the cooling eye when the circuit completer is activated; c) a first burn guard attachable around the cooking eye and a second burn guard attachable around the cooling eye; d) vertical slits beginning at the top of the first burn guard and at the top of the second burn guard; and e) at least one piece of cookware comprising a handle. The cooking eye and the cooling eye are attached to a top of the cooktop. The at least one controller is attached to the cooktop proximal the cooking eye and/or the cooling eye. The first burn guard and the second burn guard each form an open cylindrical tube. The at least one piece of cookware is placeable on either the cooking eye or the cooling eye. The handle can be simultaneously placed in the first vertical slit of the first burn guard and the second vertical slit of the second burn guard when the first burn guard and the second burn guard are attached to the cooktop and the piece of cookware is placed on either the cooking eye or the cooling eye.

In yet another embodiment, the present disclosure provides a safe cooking system. The safe cooking system comprises a) a cooktop comprising a cooking eye, a cooling eye, and an electric power cord; b) a first controller and a second controller, each capable of operating the cooking eye when the electric power cord is plugged into an outlet; c) a first burn guard attachable around the cooking eye and a second burn guard attachable around the cooling eye; d) vertical slits beginning at the top of the first burn guard and at the top of the second burn guard; and e) at least one piece of cookware comprising a handle. The cooking eye and the cooling eye are attached to the top of the cooktop, and the first controller and the second controller are each attached to the cooktop proximal the cooking eye. The first controller is usable to set a heat intensity of the cooking eye, and the second controller is usable to set a time period of the heat intensity The first burn guard and the second burn guard each form an open cylindrical tube. The at least one piece of cookware is placeable on either the cooking eye or the cooling eye. The handle can be simultaneously placed in the first vertical slit of the first burn guard and the second vertical slit of the second burn guard when the first burn guard and the second burn guard are attached to the cooktop and the piece of cookware is placed on either the cooking eye or the cooling eye. The electric power cord is attached to a side or the back of the cooktop.

In yet another embodiment, the present disclosure provides a conversion kit for converting a commercial stovetop into a safe-cooking stovetop. The conversion kit comprises a) a cooling eye conversion unit placeable on a converted eye of the stovetop, b) a first burn guard attachable around a cooking eye and a second burn guard attachable around the converted eye, c) a control panel attachable to the stovetop, and at least one piece of cookware comprising a handle. The cooling eye conversion kit comprises a housing with a support plate on top of the housing, a motorized fan within the housing, and at least three support legs elevating the housing above the converted eye. The first burn guard and the second burn guard each form an open cylindrical tube. A first vertical slit begins at the top of the first burn guard and a second vertical slit begins at the top of the second burn guard. The at least one piece of cookware is placeable on either the cooking eye or the cooling eye conversion unit. The handle can be simultaneously placed in the first vertical slit of the first burn guard and the second vertical slit of the second burn guard when the first burn guard and the second burn guard are attached to the cooktop and the piece of cookware is placed on either the cooking eye or the cooling eye conversion unit. The control panel comprises a timer with an audible alarm. When the control panel is attached to the stovetop, the control panel is capable of blocking access to a stovetop controller for the converted eye.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

According to an embodiment of the invention, a safe-cooking cooktop comprises a cooking eye, a cooling eye, a circuit completer, a first controller and a second controller. The cooking eye and the cooling eye are attached to a top of the cooktop. When the circuit completer is activated, the circuit completer is usable to enable the first controller and the second controller. The first controller is usable to set a heat intensity of the cooking eye, and the second controller is usable to set a time period of the heat intensity. The first controller and the second controller are attached to the cooktop proximal to the cooking eye The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As used herein, the term "and/or", when used in a list of two or more items, means that any one of the listed items can be employed by itself, or any combination of two or more of the listed items can be employed. For example, if a composition is described as containing compounds A, B, "and/or" C, the composition may contain A alone; B alone; C alone; A and B in combination; A and C in combination; B and C in combination; or A, B, and C in combination.

Figure 1A:
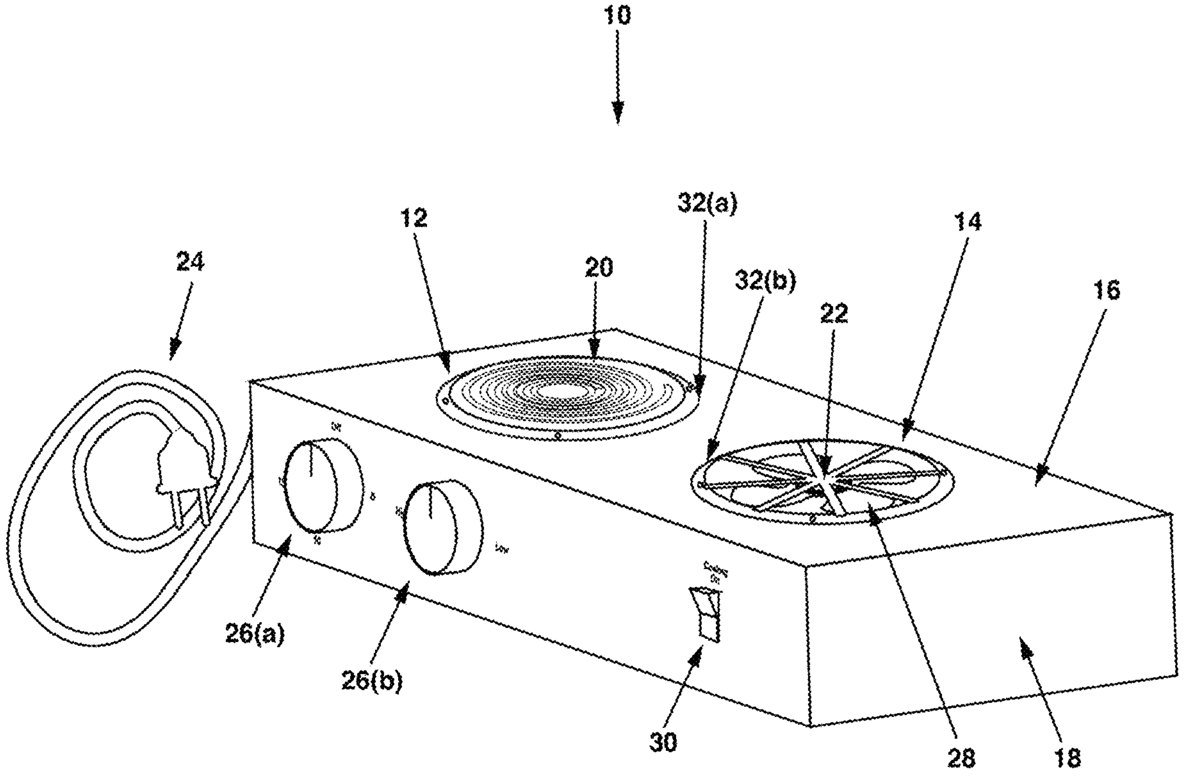
FIG. 1*a* is a perspective view schematic of a non-limiting embodiment of a portable safe-cooking cooktop.

FIG. 1*a* is a perspective-view schematic of a non-limiting embodiment of the inventive cooktop 10. The cooktop 10 comprises a cooking eye 12 and a cooling eye 14 set on the top surface 16 of a cuboidal supporting structure 18. The cooking eye 12 in FIG. 1*a* is shown as an electric coil burner 20. The cooling eye 14 has an open support plate 22 that is slightly higher than the top surface 16. The cooktop 10 is powered by electricity when cord 24 is plugged into an electric outlet (not shown).

Two separate controls, 26(*a*) and 26(*b*), are used to operate cooking eye 12. Controller 26(*a*) can be used to set a timer for electrical flow to the electrical coil burner 20. The controller 26(*a*) can be used to operate the cooking eye 12 for from a small amount of time up to 15 minutes. In some aspects, typical settings for the controller 26(*a*) are 5 minutes, 10 minutes, and 15 minutes. The controller 26(*a*) is used to ensure that the cooking eye 12 is not left on for more than 15 minutes. A person cooking on cooktop 10 can reset the controller 26(*a*) to add more time if more than 15 minutes of cooking time is required for a given recipe. When controller 26(*a*) is in the off position, current cannot flow to the electric coil burner 20. Controller 26(*b*) is used to set the amount of current to, and correspondingly the amount of heat emitted by, the electric coil burner 20. In some aspects, the options for the controller 26(*b*) are high and low.

After cooking a recipe in a pan (not shown) on cooking eye 12, the pan can be transferred from the cooking eye 12 to the cooling eye 14. When moved to cooling eye 14, the pan sits on open support plate 22. In some aspects, cooling eye 14 facilities cooling of the pan by using a fan 28 to blow ambient air through the open support plate 22. The fan 28 is housed below the cooling eye 14 within cuboidal supporting structure 18. In some aspects, the controller 30 provides an on/off switch for the fan 28.

A burn guard (not shown in FIG. 1*a*) can be attached to the cooktop 10 around the cooking eye 12 and/or the cooling eye 14 along fastening edges 32(*a*) and 32(*b*), respectfully.

Figure 1B:
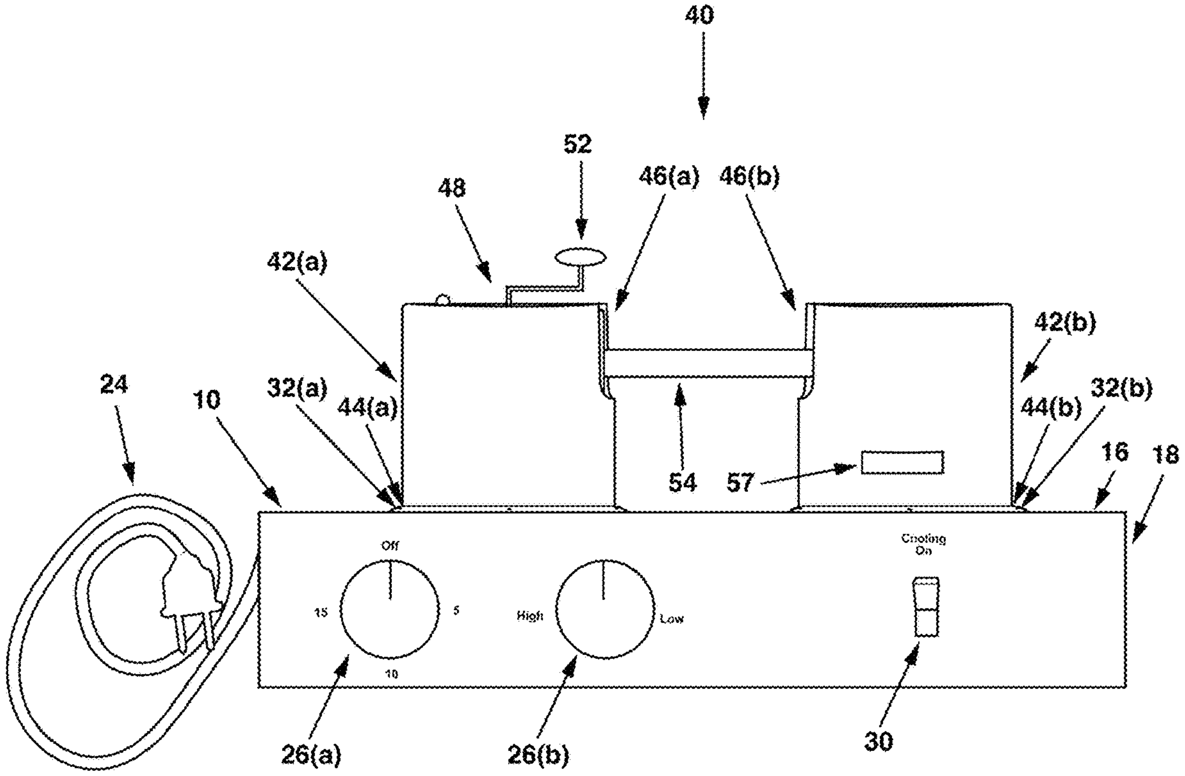
FIG. 1*b* is a front view schematic of a non-limiting embodiment of a safe cooking system including the safe-cooking cooktop of FIG. 1*a* with burn guards and a deep cooking pot.
Figure 1C:
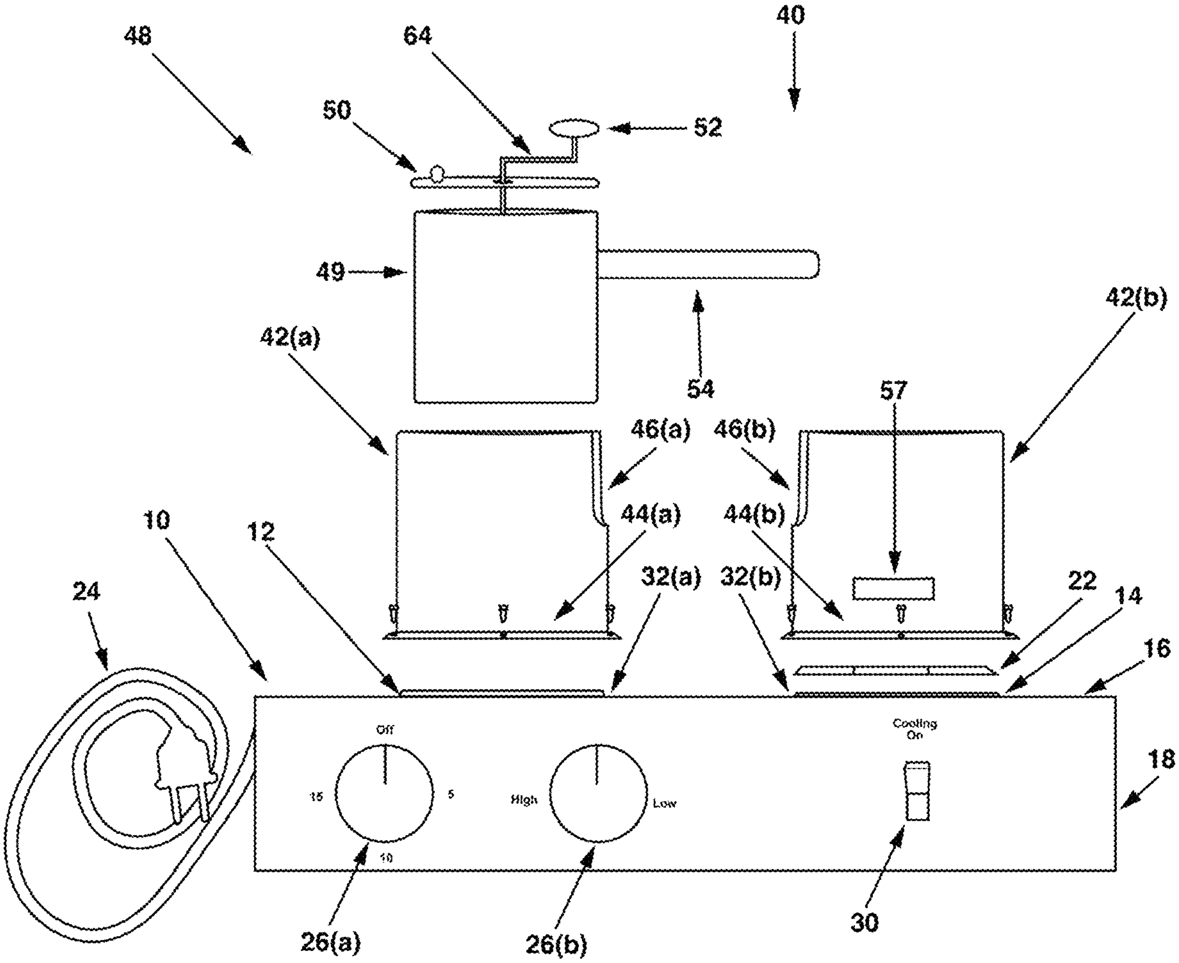
FIG. 1*c* is an exploded front view schematic of the same non-limiting embedment of the safe cooking system shown in FIG. 1*b;*

FIGS. 1*b* and 1*c* are front-view and exploded view schematics of a non-limiting embodiment of a safe cooking system 40 that includes the cooktop 10 as shown in FIG. 1*a*. Burn guards 42(*a*) and 42(*b*) are attached to the cooktop 10 around the cooking eye 12 and the cooling eye 14. The burn guards 42(*a*) and 42(*b*) are essentially cylinder-shaped objects with open tops and bottoms. The burn guards 42(*a*) and 42(*b*) can be made from heat resistant flexible sheets such as, for example, sheets of silicon. The bottom edges 44(*a*) and 44(*b*) of burn guards 42(*a*) and 42(*b*), respectively, can be attached to cooktop 10 along fastening edges 32(*a*) and 32(*b*), respectively. For example, the bottom edges of the burn guards 42(*a*) and 42(*b*) can be screwed into threaded holes along the fastening edges 32(*a*) and 32(*b*), respectively. The burn guards 42(*a*) and 42(*b*) each has a vertical slot 46(*a*) and 46(*b*), respectively, extending from the top down for several inches of each of the burn guards 42(*a*) and 42(*b*). When the burn guards 42(*a*) and 42(*b*) are properly installed, the vertical slots 46(*a*) and 46(*b*) face each other in the center of cooktop 10.

The burn guards 42(*a*) and 42(*b*) are designed to have a pan placed within one or the other of them at a time. FIGS. 1*b* and 1*c* show deep cooking pot 48 placed on the burner eye 12 and within burn guard 42(*a*). The deep-cooking pot 48 has a pot 49, a lid 50, a stirring handle 52 connected to a shaft 64, and a handle 54. When the pot 49 is placed on the cooking eye 12, the lid 50 is near the top of the burn guard 42(*a*) and stirring handle 52 is above the burn guard 42(*a*). The handle 54 extends from the pot 49 out of the burn guard 42(*a*) through the vertical slot 46(*a*) and into the burn guard 42(*b*) through the vertical slot 46(*b*). The design and placement of the vertical slots 46(*a*) and 46(*b*) ensures i) that the deep-cooking pot 48 is securely located within one of the burn guards, 42(*a*) and 42(*b*), and ii) that the pan handle 54 is not extending out beyond the cuboidal supporting structure 18 where it could be knocked off the cooktop 10. When heating is completed, deep-cooking pot 48 can be lifted by its handle 54 above the burn guard 42(*a*), rotated 180 degrees and set down on the cooling eye 14 inside of the burn guard 42(*b*). The fan 28 below the cooling eye 14 can be turned on using switch 30 to cool the pot 49. The transparent portion 57 of the burn guard 42(*b*) can be used to see a color change in the pot 49 if the pot 49 has a material that changes color as the pot 49 cools.

Figure 2A:
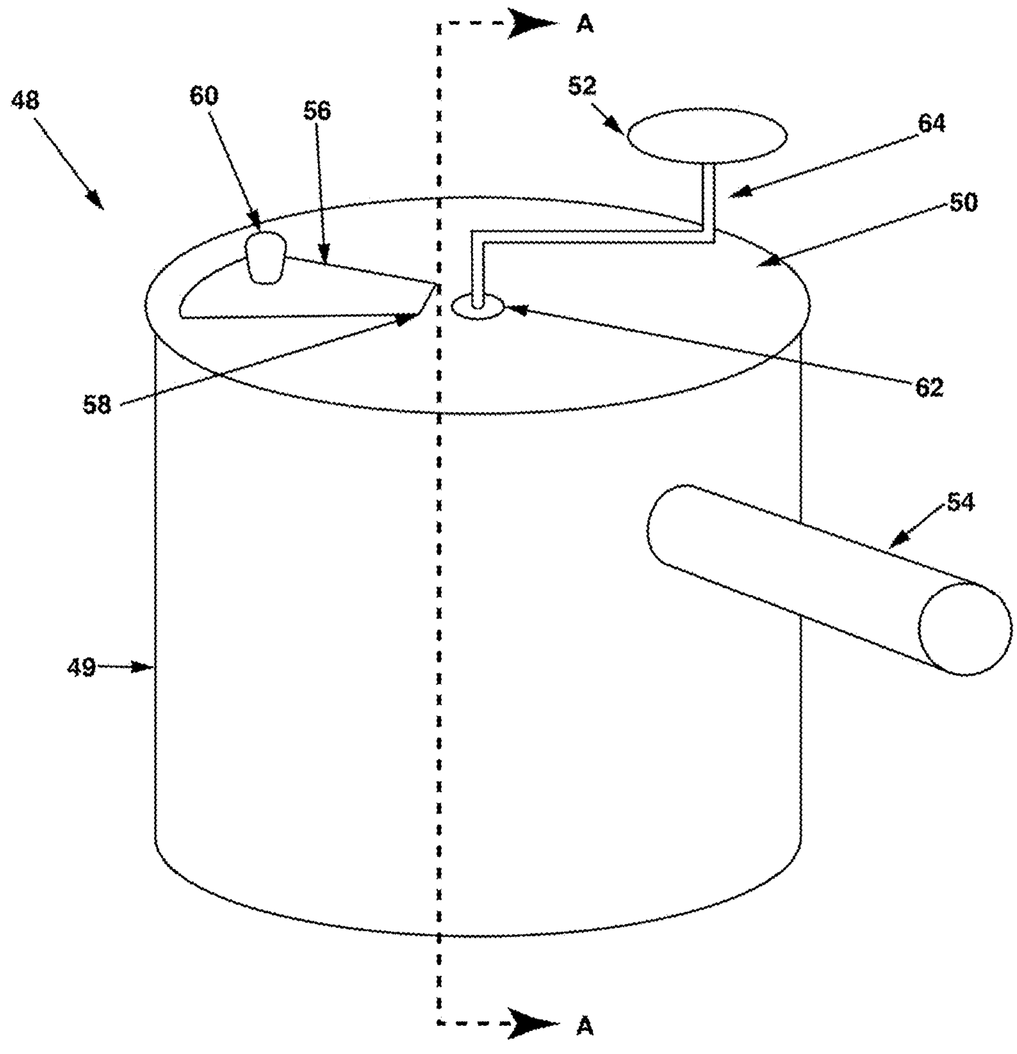
FIG. 2*a* is a perspective view schematic of a deep-cooking pot usable with the safe cooking system of FIGS. 1*b* and 1*c;*
Figure 2B:
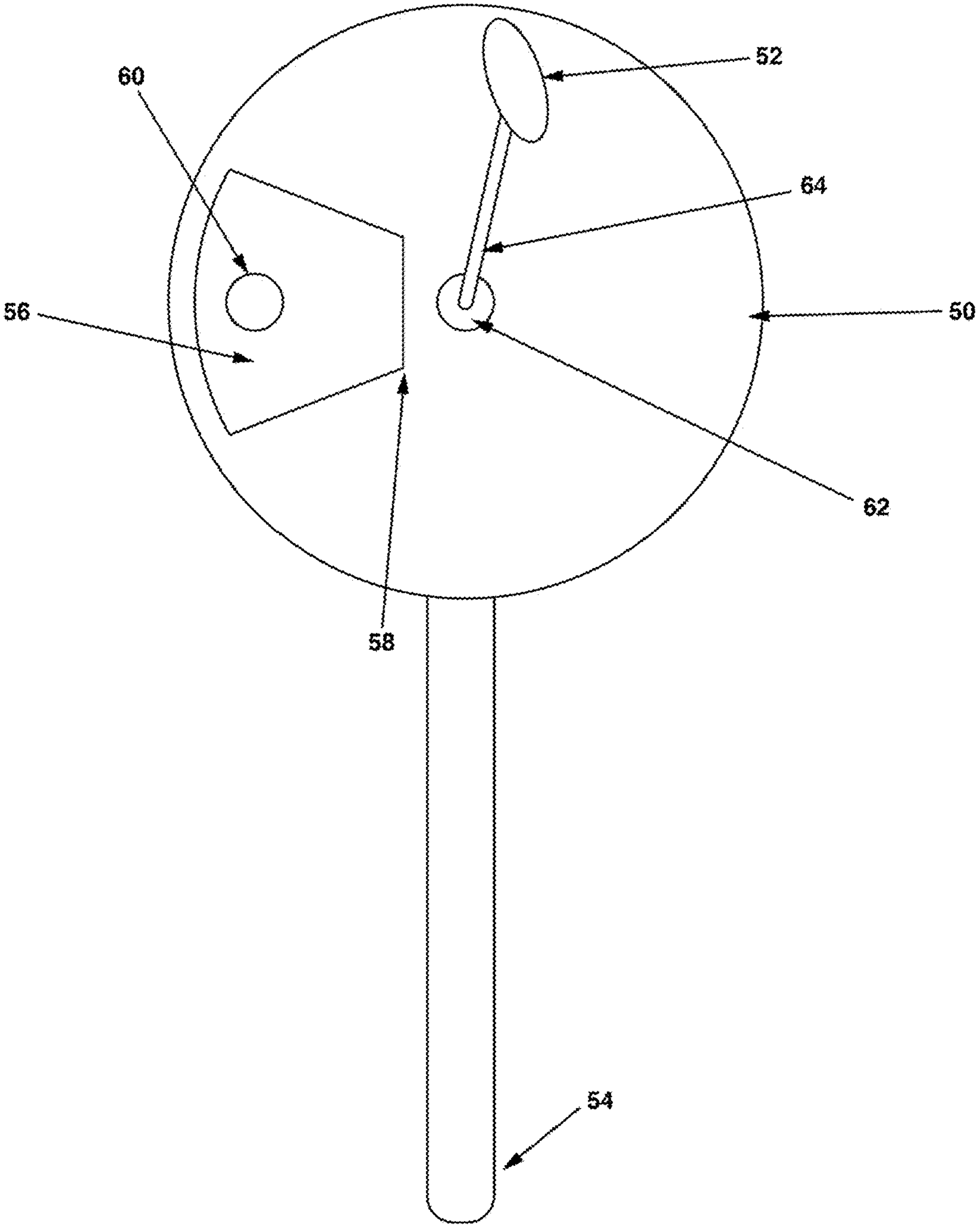
FIG. 2*b* is a top view schematic of the same deep-cooking pot shown in FIG. 2*a;*
Figure 2C:
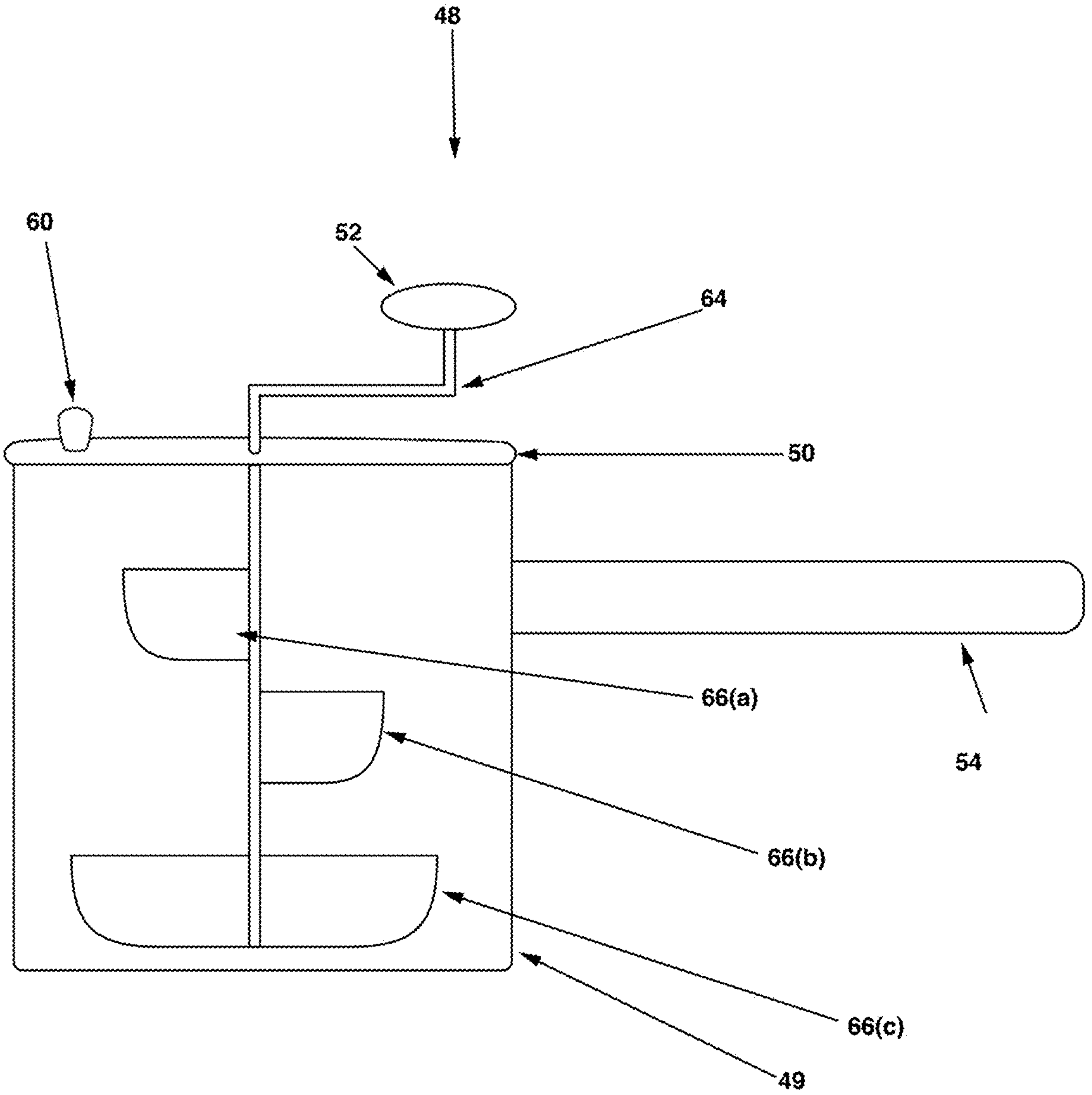
FIG. 2*c* is a sectional view schematic of the same deep-cooking pot shown in FIG. 2*a;*

FIGS. 2*a*-2*c* are perspective, top, and sectional views of a schematic of the deep-cooking pot 48 shown in FIGS. 1*b* and 1*c*. The deep-cooking pot 48 is open at the top which can be covered by the lid 50. The lid 50 ensures that the food and/or liquid (not shown) in the pot 49 remain in the pot 49 while being heated. If items (not shown) need to be added to the pot 49, cover 56 can be pivotally raised around the back edge 58 by raising the knob 60, revealing an opening (not shown) for adding items to the pot 49. The material used for the knob 60 is not particularly limited as long as the knob 60 remains at a safe temperature to touch when the pot 49 is heated. Once the item(s) (not shown) have been added to the pot 49, simply releasing the knob 60 will allow the cover 56 to close.

The contents of the pot 49 can be stirred by rotating the stirring handle 52 around the center opening 62 of the lid 50. Stirring handle 52 is located proximal to the circumference of the lid 50 for easy accessibility. As with the knob 60, The material used for the stirring handle 52 is not particularly limited as long as the stirring handle 52 remains at a safe temperature to touch when the pot 49 is heated. Stirring handle 52 is shown as an ergonomic-grip rotating handle, allowing the user to readily stir the contents of the pot 49 with a simple arm motion. The bottom of the stirring handle 52 is vertically connected to shaft 64. Above the lid 50, the shaft 64 makes a 90 degree turn to be horizontal, parallel to the lid 50, between the stirring handle 52 and the center opening 62. Proximal the center opening 62, the shaft 64 makes a second 90 degree turn and extends down through the center opening 62 and into the pot 49. The blades 66(*a*), 66(*b*), and 66(*c*) are attached to shaft 64 at different locations. As shown in in FIGS. 2*a* and 2*c*, the blade 66(*a*) protrudes from one side of the shaft 64 and the blade 66(*b*) protrudes from the opposite side of the shaft 64, below the blade 66(*a*). The blade 66(*c*) protrudes from both sides of the shaft 64 and is located below blade 66(*b*). The blade 66(*c*) is capable of scraping the bottom of the pot 49. The combination of the stirring handle 52, the shaft 64, and the blades 66(*a*)-(*c*) allows the user to stir the contents of the pot 49 without removing the lid 50. This capability keeps the user away from any heat, steam, and/or splashes when stirring the contents of the pot 49.

Figure 3:
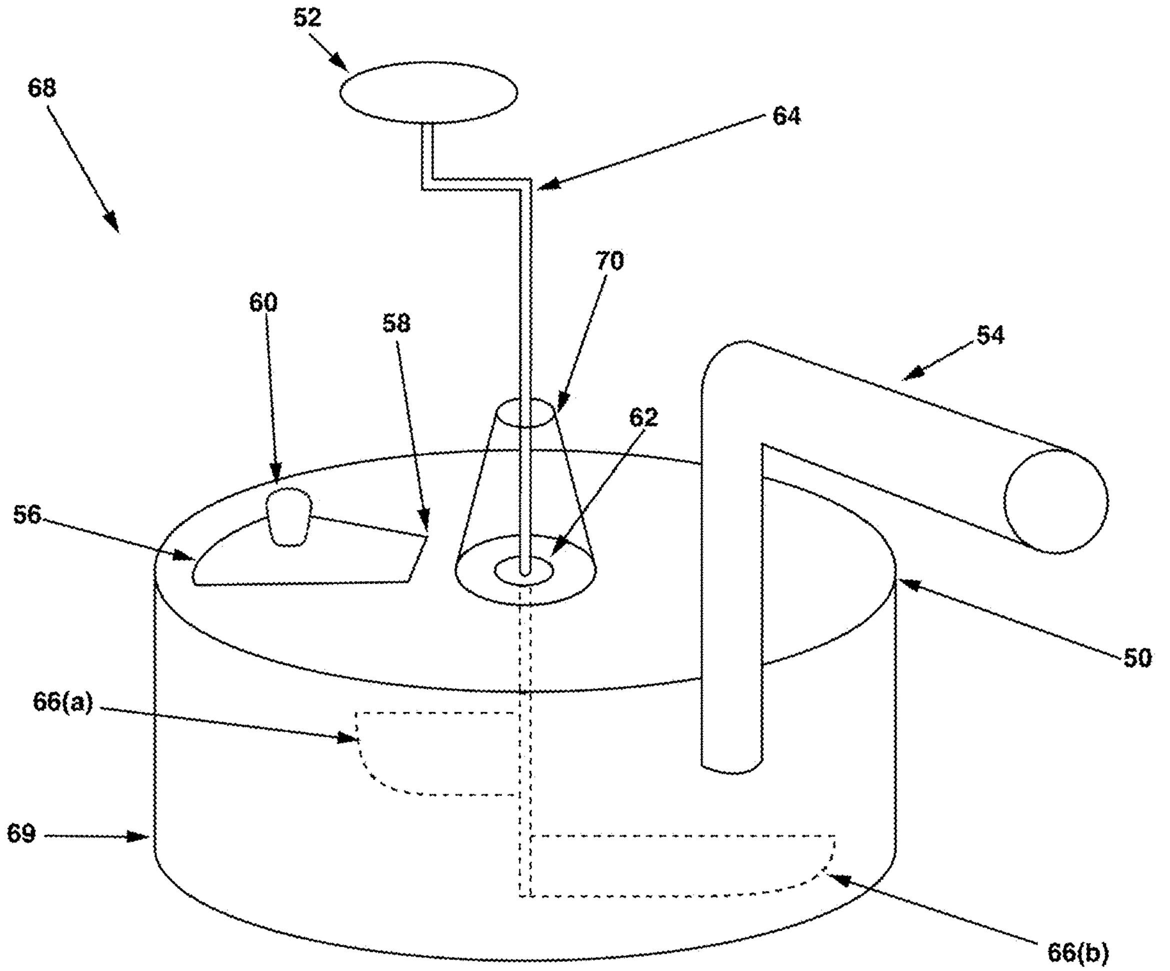
FIG. 3 is a perspective view schematic of a saucepan usable with the safe cooking system.

The deep-cooking pot 48 is shown as part of the safe cooking system 40 that includes cooktop 10. Pots and pans of other sizes can also be used with safe cooking system 40. FIG. 3 is a perspective view of a schematic of the saucepan 68 which also can be used as part of the safe cooking system 40. Saucepan 68 has many of the same features as the deep-cooking pot 48. The saucepan 68 has a pan 69, a lid 50, a stirring handle 52 connected to the shaft 64, and a handle 54. The pan 69 is open at the top which can be covered by the lid 50. The lid 50 ensures that the food and/or liquid (not shown) in the pan 69 remain in the pan 69 while being heated. If items (not shown) need to be added to the pan 69, cover 56 can be pivotally raised around the back edge 58 by raising the knob 60, revealing an opening (not shown) for adding items to the pan 69. The material used for the knob 60 is not particularly limited as long as the knob 60 remains at a safe temperature to touch when the pan 69 is heated. Once the item(s) (not shown) have been added to the pan 69, simply releasing the knob 60 will allow the cover 56 to close.

The handle 54 on pot 49 protrudes horizontally from pot 49 such that the handle 54 fits into vertical slots 46(*a*) and 46(*b*). As pan 69 is significantly shallower than pot 49, the handle 54 protrudes vertically from the side of pan 69 and then bends at a 90 degree angle to be placeable into the vertical slots 46(*a*) and 46(*b*) when the pan 69 is on the cooking eye 12 or the cooling eye 14. Also, in order for the stirring handle 52 to be above the burn guard 42(*a*), a significant portion of the shaft 64 is above the lid 50. Between the stirring handle 52 and the lid 50, the shaft 64 passes through safe-stir stabilizer 70 which can rest on the lid 50 above the center opening 62. The safe-stir stabilizer 70 assures that the shaft 64 maintains an overall vertical orientation while a user rotates stirring handle 52 above the circumference of the pan 69.

Figure 4:
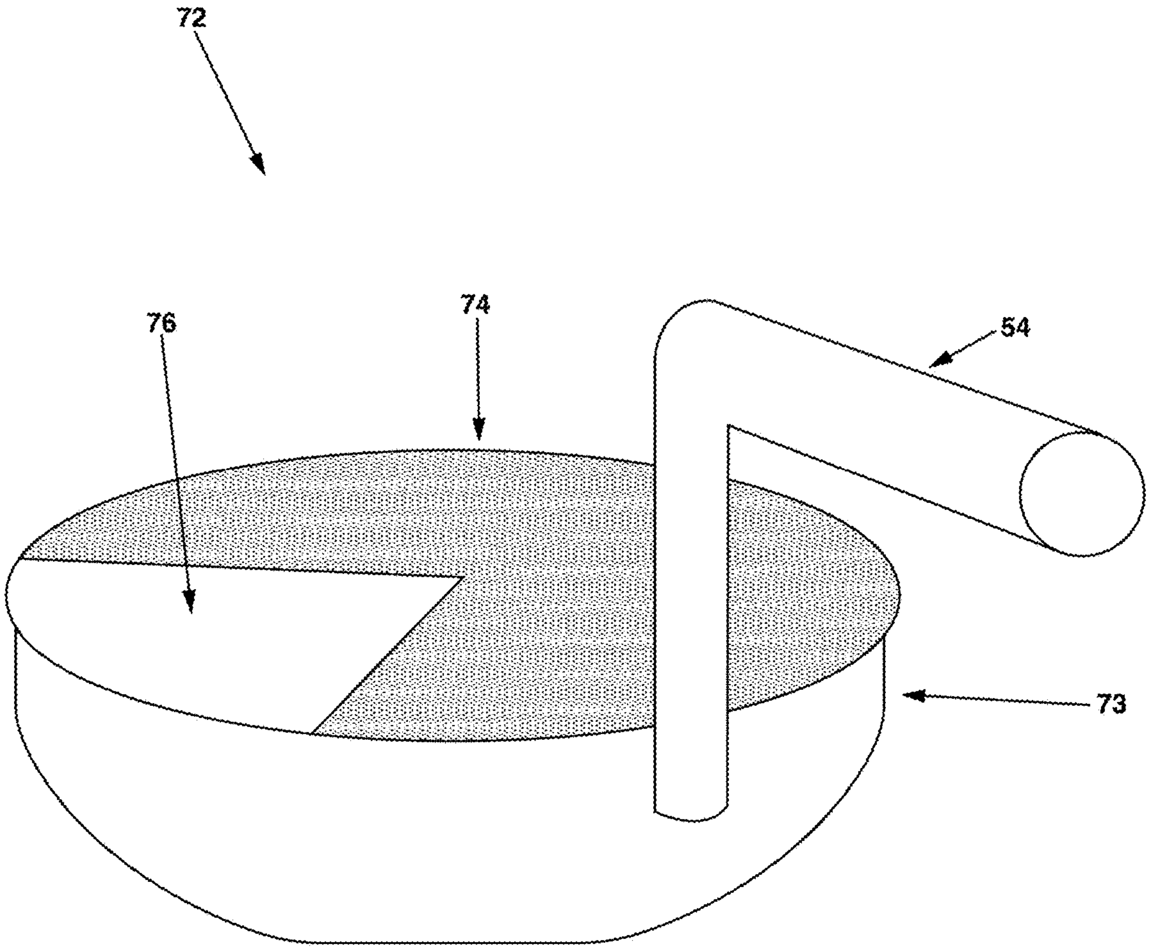
FIG. 4 is a perspective view schematic of a fry wok usable with the safe cooking system.

FIG. 4 is a perspective view of a schematic of the fry wok 72 which also can be used, in place of the deep-cooking pot 48, as part of the safe cooking system 40. The fry wok 72 has a wok 73, a wire mesh lid 74, with an opening 76 and a handle 54. The handle 54 for the fry wok 72 is configured in the same manner as for the saucepan 68. The wok 73 is open at the top which can be covered by the wire-mesh lid 74. The lid 74 has a triangular-shaped opening 76 which allows a spatula (not shown) to be inserted for flipping a food item (not shown).

Figure 5A:
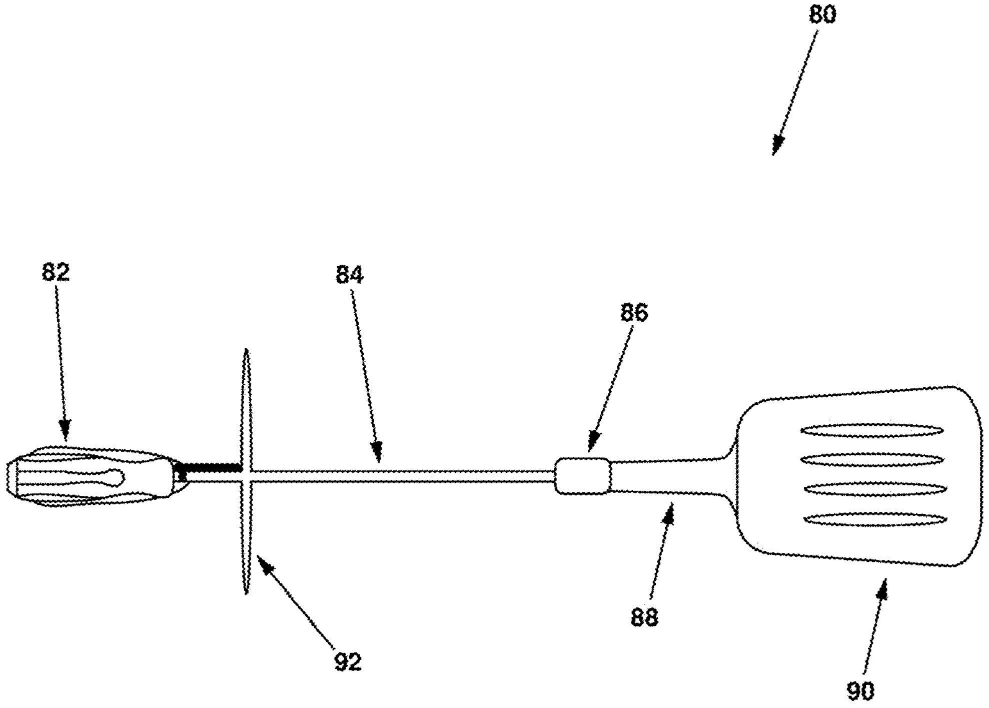
FIG. 5*a* is a top view schematic of spatula usable with the safe cooking system with the spatula blade in its default position.
Figure 5B:
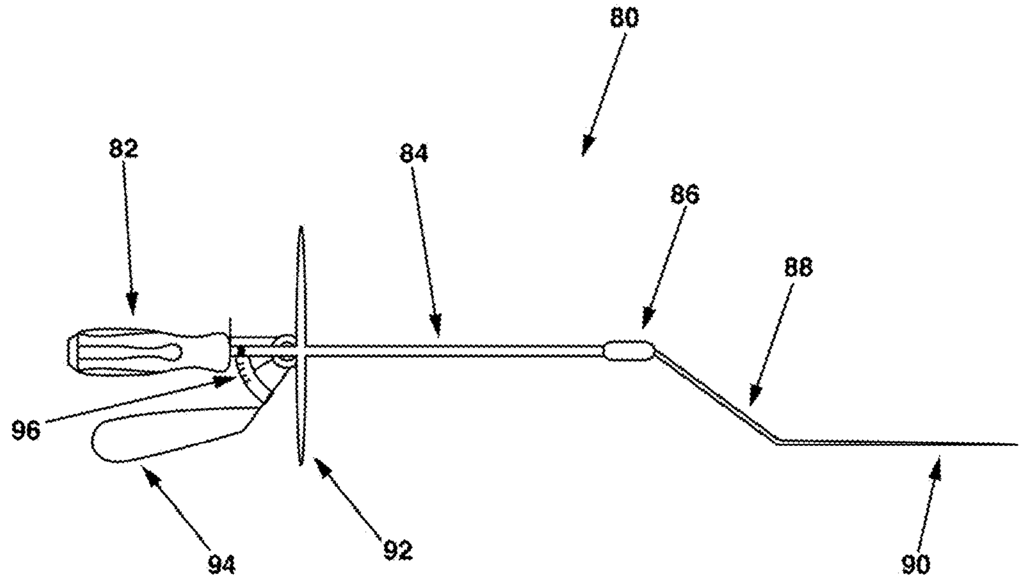
FIG. 5*b* is a side view schematic of the spatula shown in FIG. 5*a* with the spatula blade in its default position.
Figure 5C:
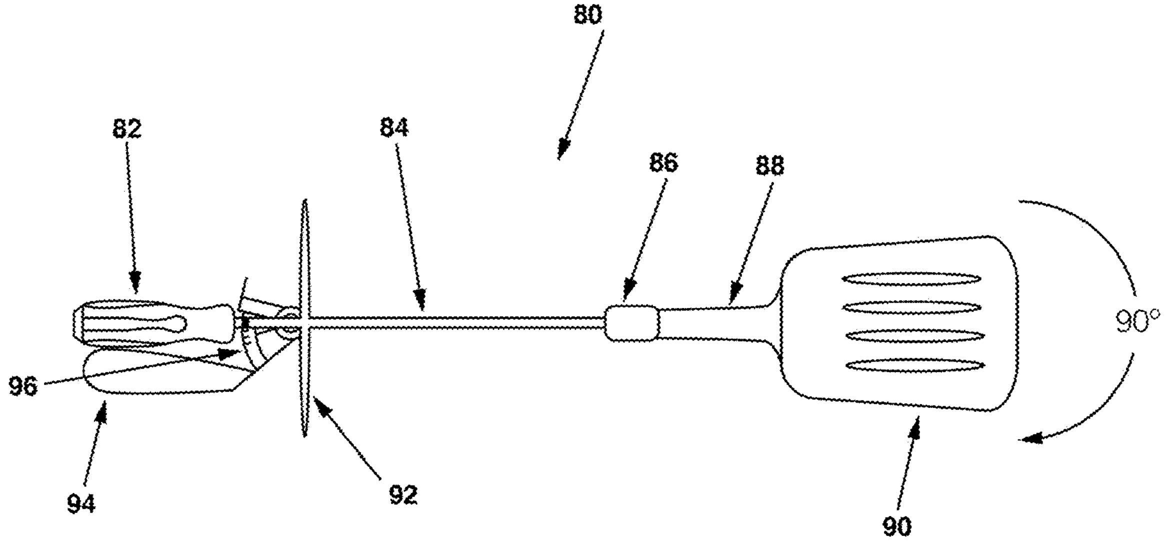
FIG. 5*c* is a side view schematic of the spatula shown in FIG. 5*b* with the spatula blade rotated 90 degrees.

FIG. 5*a* is a top view of a schematic of a spatula useable with, for example, the fry wok 72. FIGS. 5*b* and 5*c* are side views of the spatula shown in FIG. 5*a* with no activation and with activation, respectively. The spatula 80 has a handgrip 82, a shaft 84, an attachment zone 86, a connector 88, and a blade 90. The shaft 84 and the blade 90 are parallel offset. In other words, the blade 90 does not overlap with the shaft 84, and is oriented in a parallel direction. To protect the user's hand (not shown) the spatula also has a splash guard 92 proximal to the handgrip 82. As activator 94 is squeezed toward the handgrip 82, turning mechanism 96 is activated and rotes blade 90, by 90 degrees, from the horizontal position as shown in FIG. 5*b* to the vertical position as shown in FIG. 5*c*. This allows a user to flip something, for exampling in wok 73, by simply squeezing the activator 94 toward handgrip 82.

Figure 6A:
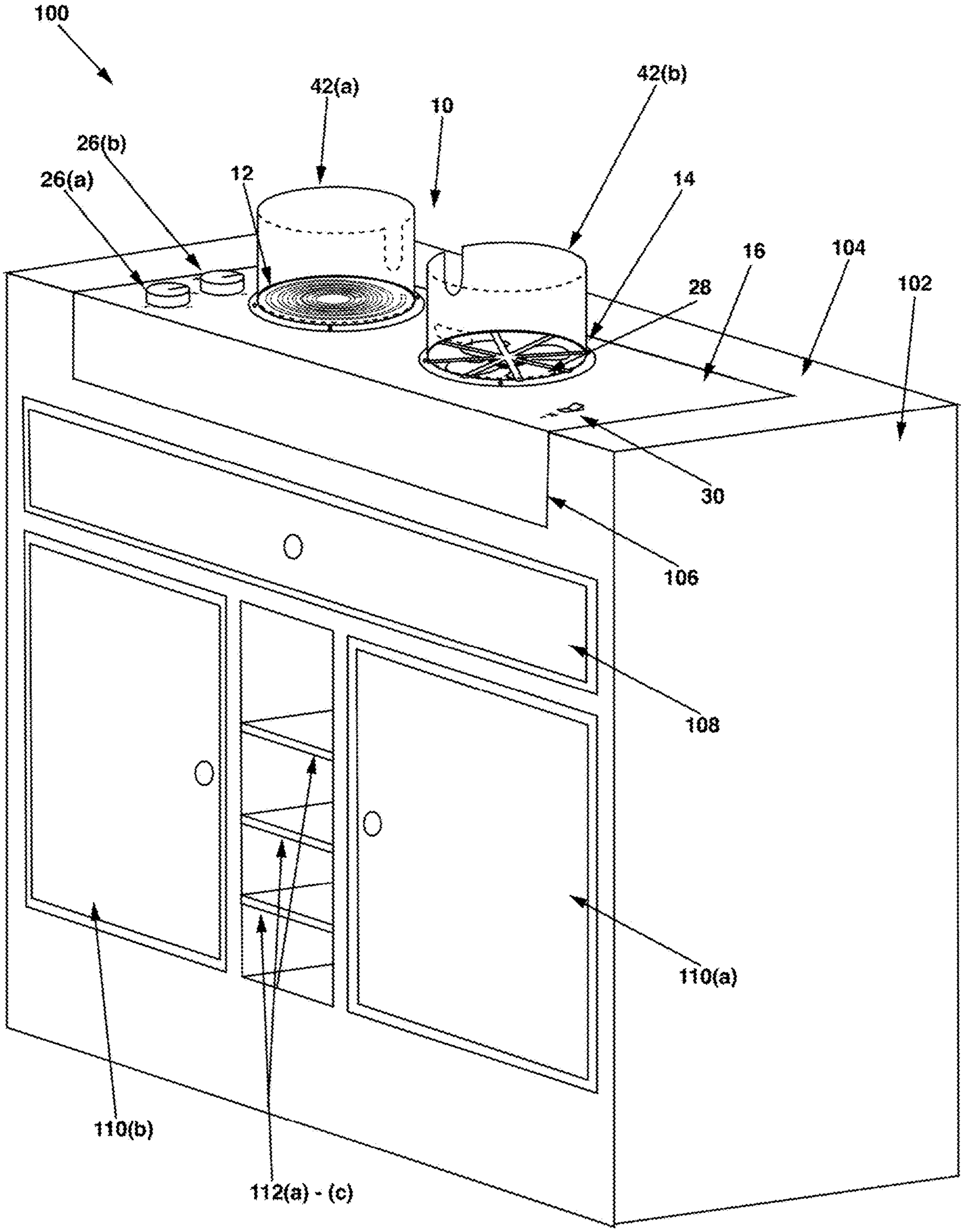
FIG. 6*a* is a perspective view a schematic of a non-limiting embodiment of a safe-cooking cooktop within the structure of a cabinet.

FIG. 6*a* is a perspective view of a schematic of a non-limiting embodiment of a cooktop attached to a structure 100 showing safe-cooking cooktop 10 within the structure of a cabinet 102. The top surface 16 of the cooktop 10 is flush with the top surface 104 of the cabinet 102. The controls 26(*a*) and 26(*b*), used to operate the cooking eye 12, are on the top surface 16 of the cooktop 10. The control 30, used to operate the fan 28 under cooling eye 14, is also on the top surface 16 of the cooktop 10. The cabinet can have a wide range of drawers, cupboards, shelves, etc. which are simple design choices. As shown in FIG. 6*a*, the front 106 of cabinet 102 is shown with one drawer 108 and two cupboards 110(*a*) and 110(*b*). Shelves 112(*a*), 112(*b*), and 112(*c*) are accessible from the front 106 of the cabinet 102.

Figure 6B:
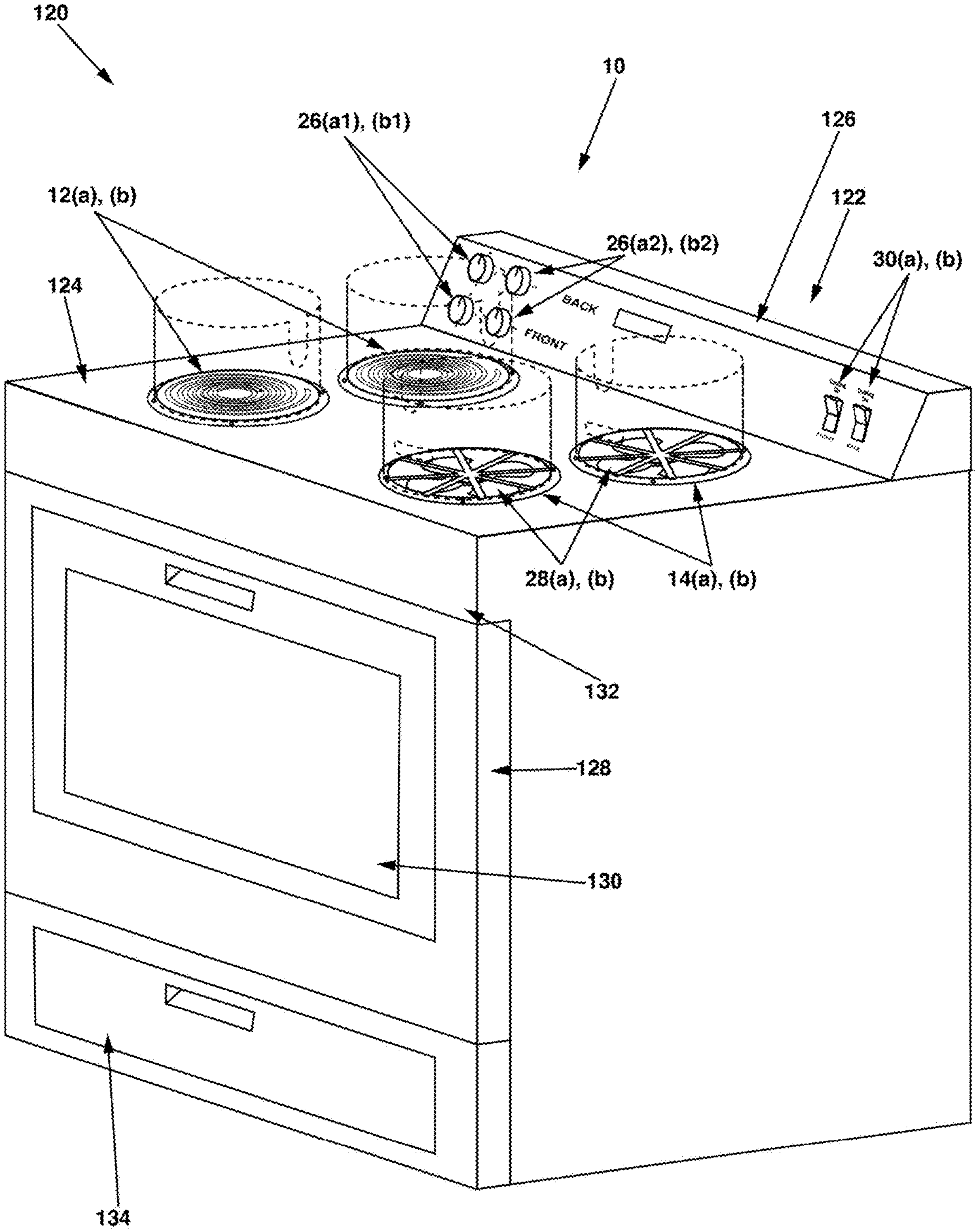
FIG. 6*b* is a perspective view schematic of a non-limiting embodiment of a safe-cooking cooktop within the structure of a multi-use appliance.

FIG. 6*b* is a perspective view of a schematic of another non-limiting embodiment of a cooktop attached to a structure 120 showing safe-cooking cooktop 10 within the structure of a multi-use appliance, the range 122. The range 122 has a cooktop 10 with two cooking eyes 12(*a*) and 12(*b*) and two cooling eyes 14(*a*) and 14(*b*) on the top surface 124. The range 122 has a control panel 126 which is attached to the back of the top surface 124. The controls 26(*a*1),(a2) and 26(*b*1),(b2), used to operate the cooking eyes 12(*a*),(*b*), are on the control panel 126 of the range 122. The controls 30(*a*),(*b*), used to operate the fans 28(*a*),(*b*) under cooling eyes 14(*a*),(*b*), are also on the control panel 126 of the range 122. The range 122 further comprises an oven 128. The oven 128 is accessible through oven door 130 located on the front side 132 of the range 122. The range 122 also has a storage drawer 134 located below the oven 128 and accessible at the front side 132 of the range 122. Oven controllers (not shown) can be placed on the front side 132 or the control panel 126 of the range 122.

Figure 7A:
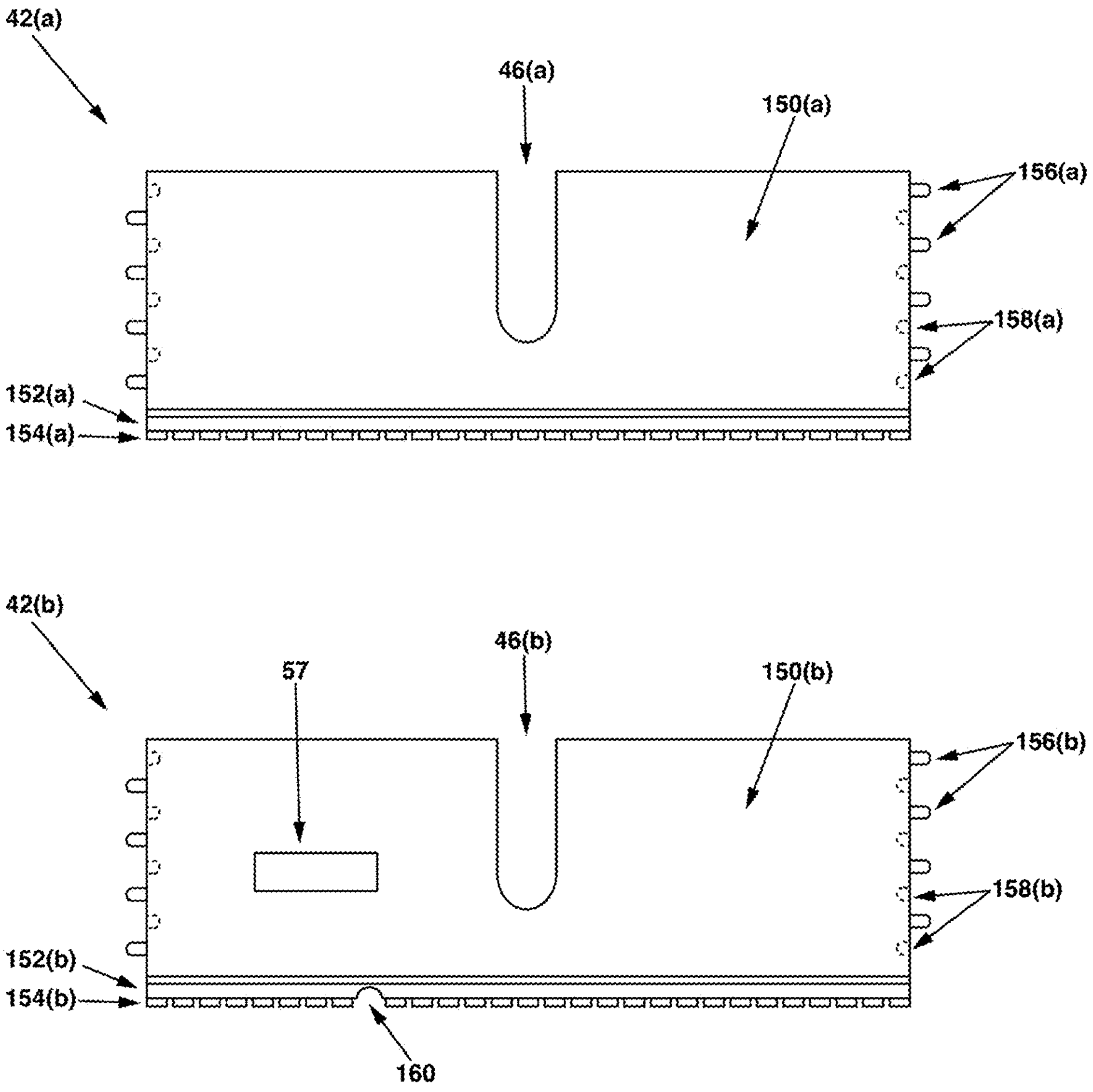
FIG. 7*a* is a front view schematic of a non-limiting embodiment of unrolled burn guards usable on the cooking eye and the cooling eye for converting an electric stovetop into a safe-cooking cooktop.
Figure 7B:
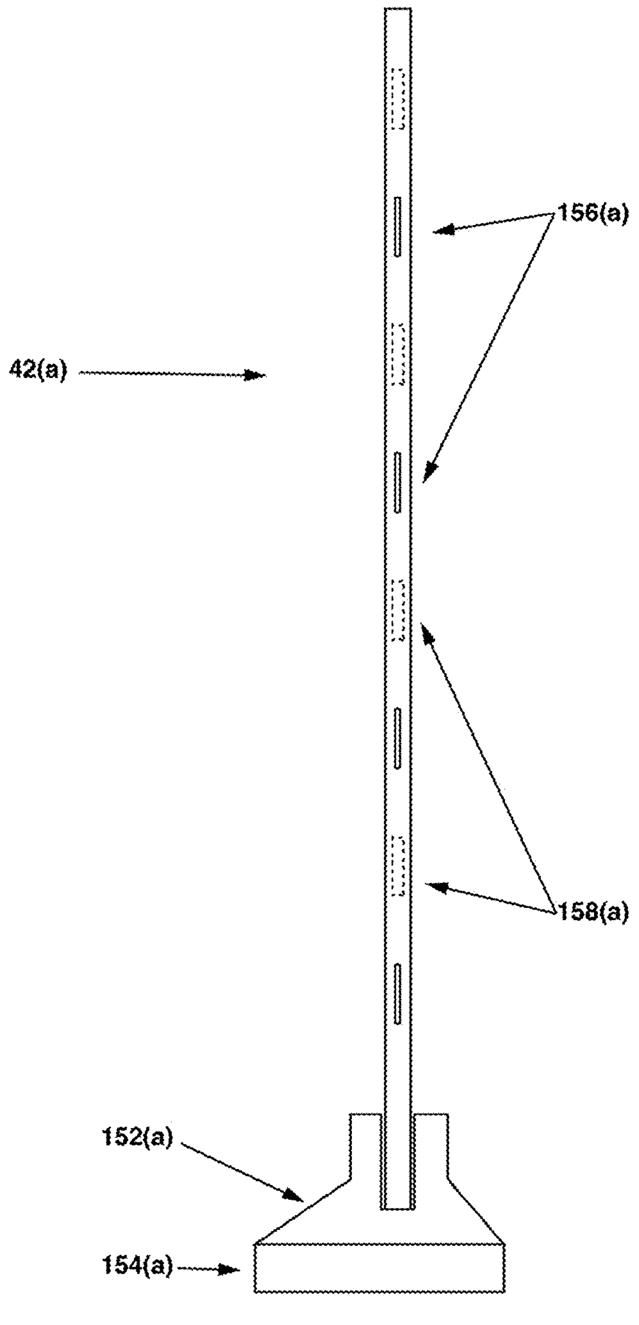
FIG. 7*b*, is a side view schematic of an unrolled burn guard of FIG. 7*a;*
Figure 7C:
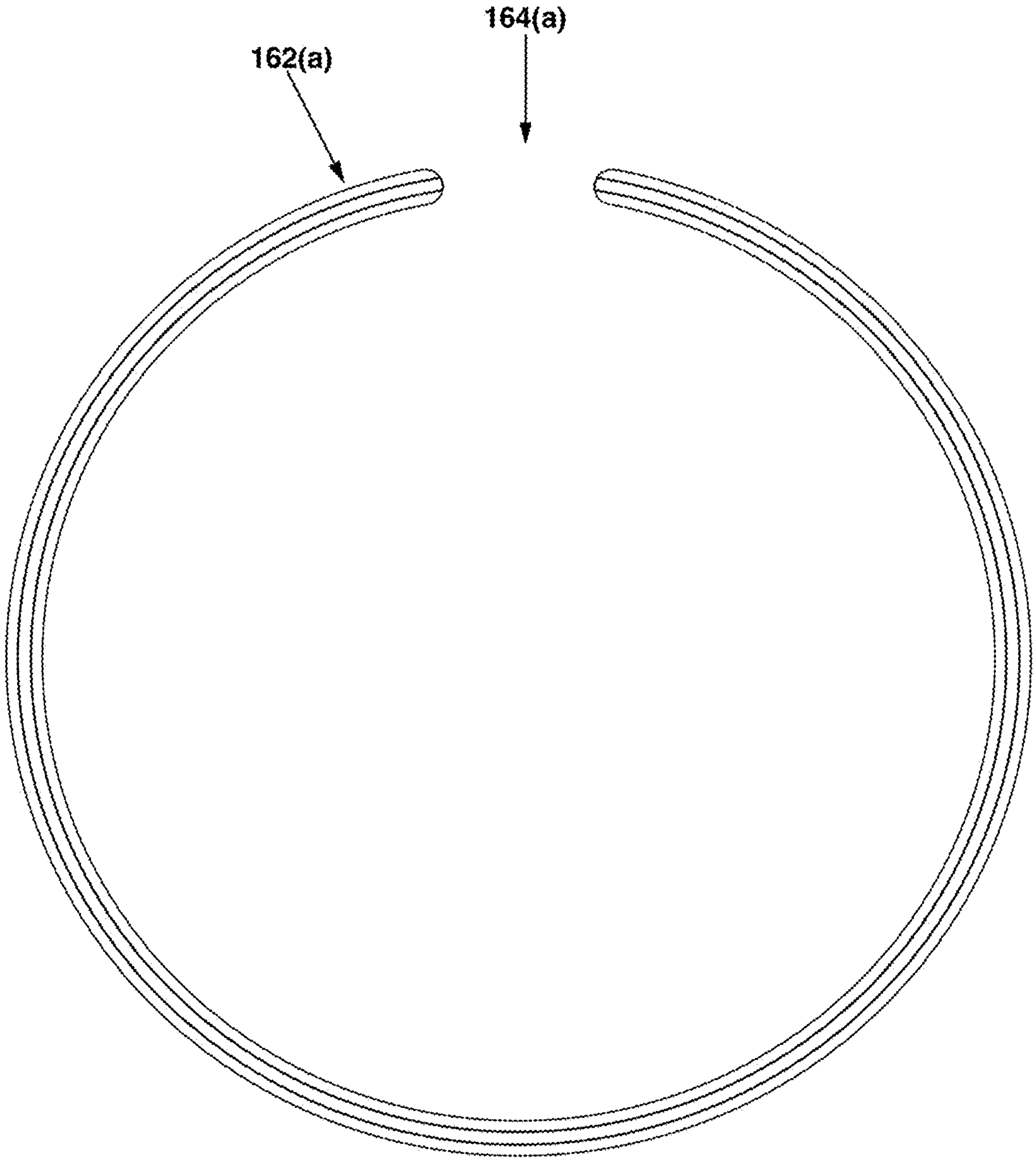
FIG. 7*c* is a top view schematic of a non-limiting embodiment of panel frame attachable to the top of either of the burn guards shown in FIG. 7*a;*

FIG. 7*a* is a front view of a non-limiting embodiment of the burn guards 42(*a*) and 42(*b*) in an unrolled configuration. Each of the burn guards 42(*a*),(*b*) is made up of a panel 150(*a*),(*b*), a housing 152(*a*),(*b*) and a series of small magnets 154(*a*),(*b*). to The bottom of each panel 150(*a*),(*b*) is attached to the top of each housing 152(*a*),(*b*), and each series of small magnets 154(*a*),(*b*) attaches to the bottom of each housing 152(*a*),(*b*) with magnetized section of each series of small magnet 154(*a*),(*b*) distal to each of the panels 150(*a*),(*b*). Burn guards 42(*a*),(*b*) are formable into cylinders and remain in the form of cylinders through a series of tabs 156(*a*),(*b*) and corresponding inserts 158(*a*),(*b*) on each side of each panel 150(*a*),(*b*). The burn guard 42(*b*) for the cooling eye further comprises an opening 160 at the base through which a power cord (not shown) can pass. FIG. 7*b* is a side view of burn guard 42(*a*) showing panel 150(*a*) inserted into housing 152(*a*) and the series of small magnets 154(*a*) attached to the bottom of the housing 152(*a*) distal to the panel 150(*a*). FIG. 7*c* shows a circular panel frame 162(*a*) with a gap 164(*a*). To add stability to burn guard 42(*a*), the circular frame 162(*a*) is attachable to the top of panel 150(*a*). The circular panel frame 162(*a*) is designed to be attached to the top of panel 150(*a*) such that gap 164(*a*) aligns with the vertical slot 46(*a*). A second circular panel frame (not shown) can similarly be attached to burn guard 42(*b*).

Figure 8A:
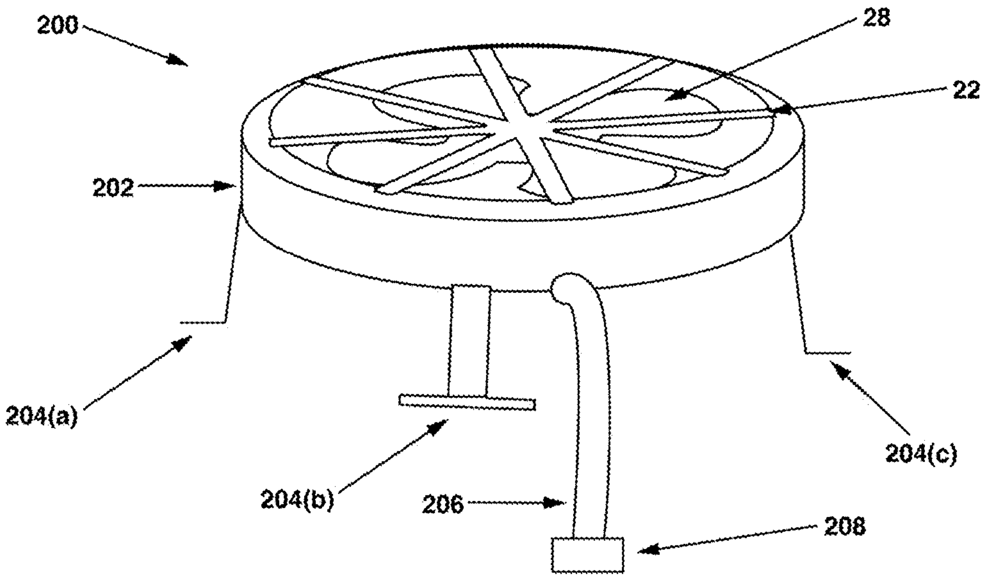
FIG. 8*a* is a perspective schematic of a non-limiting embodiment of a cooling eye conversion unit usable for converting an electric stovetop into a safe-cooking cooktop.
Figure 8B:
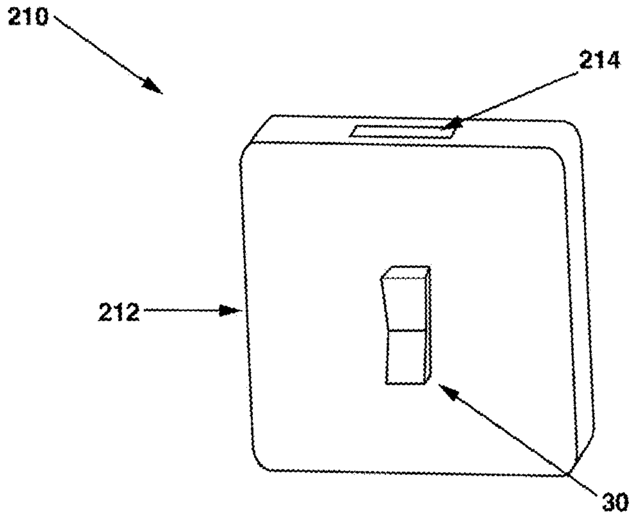
FIG. 8*b* is a perspective view of a non-limiting embodiment of an independent power source usable for operating the fan of the cooling eye conversion unit shown in FIG. 8*a;*

FIG. 8*a* is a perspective view of a non-limiting embodiment of a cooling eye converter 200. The cooling eye converter elevates the support plate 22 and the fan 28 above the existing eye on the stovetop (not shown). The support plate 22 is attached to the top of the housing 202 and the fan 28 is attached to the inside of the housing 202. The elevation of the support plate 22 and the fan 28 is accomplished by support legs 204(*a*),(*b*),(*c*) which hold up the housing 202 with its attached support plate 22 and fan 28. The power cord 206 is electrically connected to the fan 28 and has a USB plug 208 distal from the fan 28. Power cord 206 is sized to fit under burn guard 42(*b*) through opening 160 to allow an independent power source (not shown) for the fan 28. FIG. 8*b* is a perspective view of a non-limiting embodiment of an independent power source 210 usable to operate the fan 28. The independent power source includes a housing 212 containing a USB port 214 capable of accepted the USB plug 208, the switch 30 capable of controlling the fan 28, and a battery (not shown) located within the housing 212.

Figure 9A:
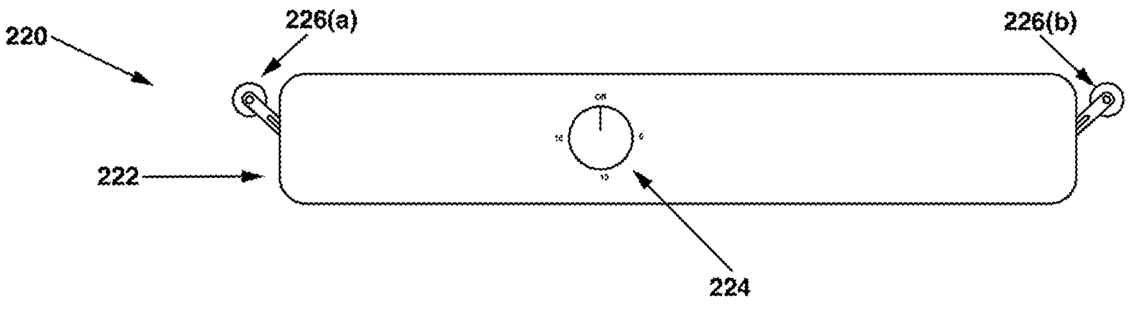
FIG. 9*a* is a front view schematic of a non-limiting embodiment of a control cover usable for converting an electric stovetop into a safe-cooking cooktop.

FIG. 9*a* is a front view of a non-limiting embodiment of a control cover 220 usable for converting an electric stovetop into a safe-cooking cooktop. The control cover is made up of a panel 222 which has on its front side a timer 224. In this embodiment, the timer 224 simply gives a sound warning that the amount of time has expired, the timer 224 is not capable of cutting the power to burner eye 12. Connected the back of the panel 222 on each side are suction cups 226(*a*),(*b*) which are attachable to the top or the side of the stovetop (not shown). The burner eye 12 can continue to be operated by the controller on the original stovetop (not shown). The panel 222 can be mounted over the control for the eye of the stovetop (not shown) on which the cooling eye converter 200 is located to avoid inadvertently sending electricity to that eye.

Figure 9B:
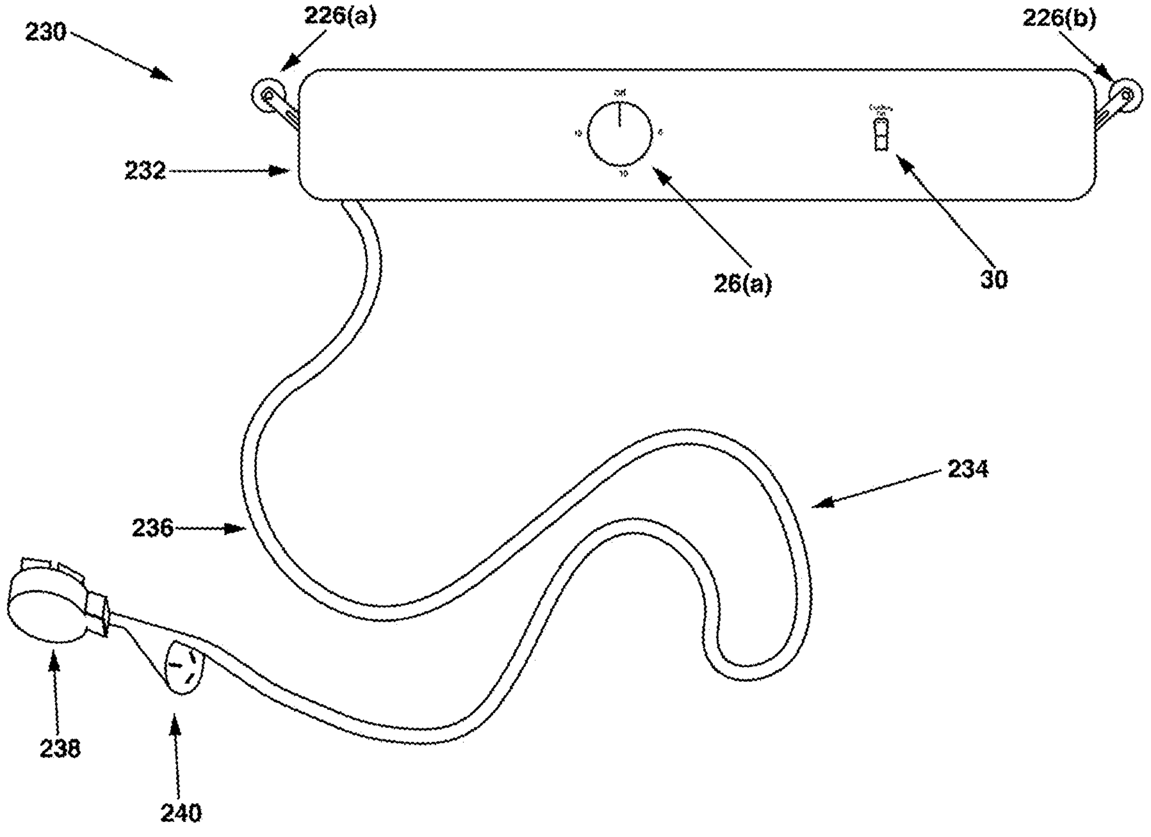
FIG. 9*b* is a front view schematic of another non-limiting embodiment of a control cover usable for converting an electric stovetop into a safe-cooking cooktop.

FIG. 9*b* is a front view of a non-limiting embodiment of a control cover 230 usable for converting an electric stovetop into a safe-cooking cooktop. Control cover 230 is made up of a panel 232 which has on its front side a timer 26(*a*) and a switch 30 to turn on the fan 28, and a power cord 234. The power cord 234 is made up of the cord 236 which is connected to the electronics (not shown) behind the panel 232 on one end and the 220V plug 238 distal to the panel 232. The 220V plug 238 is able to be plugged into the same outlet that the unconverted stovetop (not shown) plugged into. The original power cord for the stovetop (not shown) can be plugged into the interceptor 240 which is connected to the 220V plug 238. The power cord 234 and the timer 26(*a*) are electronically connected such that power will not go to the original power cord for the stovetop (not shown) if the timer 26(*a*) is in the off position.

In some aspects, the safe-cooking cooktop comprises a cooking eye, a cooling eye, a circuit completer, a first controller, and a second controller. In some aspects, the cooking eye and the cooling eye are attached to a top of the cooktop. In some aspects, when the circuit completer is activated, the circuit completer is usable to enable the first controller and the second controller. In some aspects, the first controller is usable to set a heat intensity of the cooking eye, and the second controller is usable to set a time period of the heat intensity. In some aspects, the first controller and the second controller are attached to the cooktop proximal to the cooking eye.

In some aspects, the cooking eye comprises an electric coil burner. In some aspects, the cooling eye comprise a support plate. In some aspects, the cooktop further comprises a fan below the cooling eye. In some aspects, the cooktop further comprises a third controller, wherein when the circuit completer is activated, the third controller is usable to activate the fan. In some aspects, the third controller is attached to the cooktop proximal to the cooling eye. In some aspects, the fan causes ambient to air flow from below the cooling eye and through the open support plate. The ambient air can be used to cool a piece of cookware sitting on the cooling eye.

In some aspects, the circuit completer comprises an electric power cord, and the circuit completer is activated when the electric power cord is plugged into an outlet. In some aspects, the electric power cord is attached to the side or the back of the cooktop. In some aspects, the circuit completer comprises a switch, and the circuit completer is activated when the switch is placed in the on position. In some aspects, the switch is proximal to the cooktop.

In some aspects, the cooktop is portable. For example, the cooktop can be placed on a counter top for use and stored either on the countertop or somewhere else. In some aspects, the cooktop is attached to a structure. Non-limiting examples of a structure include a shelf, a cabinet, a cart, a multi-use appliance, or a kitchen countertop. A cooktop attached to a kitchen countertop is built-into the kitchen countertop similar to when a commercially available stove top is built-into a kitchen countertop.

In some aspects, the cooktop comprises a first burn guard and a second burn guards. The first burn guard and the second burn guard each form an open cylindrical tube. In some aspects, the first burn guard is attached to the cooktop around the cooking eye and the second burn guard is attached to the cooktop around the cooling eye. The burn guards provide protection against burns to the person cooking on the cooktop. In some aspects, a bottom edge of the first burn guard is fastened to a first fastening edge, wherein the first fastening edge surrounds the cooking eye. In some aspects, a bottom edge of the second burn guard is fastened to a second fastening edge, wherein the second fastening edges surrounds the cooling eye.

In some aspects, each of the first burn guard and the second burn guard comprises a vertical slit starting from the top and ending around half way down each of the first burn guard and the second burn guard. In some aspects, a pot handle can simultaneously pass through the first burn guard vertical slit and the second burn guard vertical slit. In some aspects, the second burn guard comprises a transparent portion proximal the front side of the cooktop when the second burn guard is attached to the cooktop. If a piece of cookware used with the cooktop has a temperature sensitive color indicator, a person using the cooktop can look through the transparent portion for indication that the piece of cookware has cooled.

In another embodiment, the present disclosure provides a safe cooking system. The safe cooking system comprises a) a cooktop comprising a cooking eye, a cooling eye, and a circuit completer; b) at least one controller capable of operating the cooking eye and/or the cooling eye when the circuit completer is activated; c) a first burn guard attachable around the cooking eye and a second burn guard attachable around the cooling eye; d) vertical slits beginning at the top of the first burn guard and at the top of the second burn guard; and e) at least one piece of cookware comprising a handle. The cooking eye and the cooling eye are attached to the top of the cooktop. The at least one controller is attached to the cooktop proximal the cooking eye and/or the cooling eye. The first burn guard and the second burn guard each form an open cylindrical tube. The at least one piece of cookware is placeable on either the cooking eye or the cooling eye. The handle can be simultaneously placed in the first vertical slit of the first burn guard and the second vertical slit of the second burn guard when the first burn guard and the second burn guard are attached to the cooktop and the piece of cookware is placed on either the cooking eye or the cooling eye.

It is to be understood that the various aspects of the cooktop, the cooking eye, the cooling eye, the circuit completer, the various controllers, a portable cooktop and a cooktop attached to a structure, and the first and second burn guards described herein above apply to the present embodiment as well.

In some aspects, the cooking eye comprises an electric coil burner. In some aspects, the at least one controller comprises a first controller usable to set a heat intensity of the cooking eye and a second controller usable to set a time period of the heat intensity. In some aspects, the first controller and the second controller are attached to the cooktop proximal to the cooking eye.

In some aspects, the cooling eye comprises a support plate. In some aspects, the cooktop further comprise a fan below the cooling eye and the at least one controller comprises a third controller usable to activate the fan. In some aspects, the third controller is attached to the cooktop proximal to the cooling eye. In some aspects, the fan causes ambient air to flow from below the cooling eye and through the open support plate when the third controller is activated.

In some aspects, the circuit completer comprises an electric power cord, and the circuit completer is activated when the electric power cord is plugged into an outlet. In some aspects, the electric power cord is attached to the side or the back of the cooktop. In some aspects, the circuit completer comprises a switch and the circuit completer is activated when the switch is placed in the on position. In some aspects, the switch is proximal to the cooktop.

In some aspects, the cooktop is portable. For example, the cooktop can be placed on a counter top for use and stored either on the countertop or somewhere else. In some aspects, the cooktop is attached to a structure. Non-limiting examples of a structure include a shelf, a cabinet, a cart, a multi-use appliance, or a kitchen countertop. A cooktop attached to a kitchen countertop is built-into the kitchen countertop similar to when a commercially available stove top is built-into a kitchen countertop.

The burn guards provide protection against burns to the person cooking on the cooktop. In some aspects, a bottom edge of the first burn guard is fastened to a first fastening edge, wherein the first fastening edge surrounds the cooking eye. In some aspects, a bottom edge of the second burn guard is fastened to a second fastening edge, wherein the second fastening edges surrounds the cooling eye. In some aspects second burn guard comprises a transparent portion proximal the front side of the cooktop and the cooling eye.

In some aspects the at least one piece of cookware is selected from the group consisting of a deep cooking pot, a saucepan, and/or a fry wok. In some aspects, the at least one piece of cookware includes a deep cooking pot. In some aspects, the deep cooking pot comprises a pot, a handle attached to the side of the pot, a lid removably attachable to an open top of the pot, and a stirrer attachable to the lid. In some aspects, the lid further comprises a first opening. In some aspects, a cover sits over the first opening, and the cover is raisable by pulling a knob attached to the top of the cover proximal to an edge of the lid. The covered opening allows a cook to add ingredients to the pot with minimum risk of splashing liquids out of the pot.

In some aspects, the stirrer comprises a stirring handle, a shaft perpendicularly attached to the bottom of the stirring handle, and at least one blade connected to the shaft. In some aspects, below the stirring handle, the shaft turns to a horizontal position and then again to a vertical position and passes through a second opening in the center of the lid. In some aspects, when the lid is attached to the deep pot, the shaft extends downward into the pot to proximal a bottom of the pot, and the at least one blade is connected to a section of the shaft within the pot. In some aspects, the at least one blade comprises one to three blades. In some aspects the at least one blade comprises three blades and the three blades comprise a) a first blade closest to the bottom side of the lid, b) a second blade below the first blade, and c) a third blade below the second blade. In some aspects, the third blade is proximal to a bottom of the pot when the lid is attached to the pot. In some aspects, a first straight side of the first blade is vertically attached to the shaft and extends at least 50% of a radius of the pot. In some aspects, a second straight side of the second blade is vertically attached to the shaft on the opposite side of the first blade and extends at least 50% of the radius of the pot. In some aspects, the third blade is vertically attached to the shaft at its middle and the third blade extends at least 75% of a diameter of the pot.

In some aspects, the stirrer is removably attached to the lid. In some aspects, the staff is separable on the vertical section above the at least one blade. In some aspects, a connector is located above the at least one blade. In some aspects the connector is usable to removably attach the at least one blade from a section of the shaft connected to the stirring handle. In some aspects, the stirrer is permanently attached to the lid.

In some aspects, the at least one piece of cookware comprises a saucepan. In some aspects the saucepan comprises a pan, the handle attached to a side of the pan, and a lid removably attachable to an open top of the pan. In some aspects, the lid further comprises a first opening. In some aspects, a cover sits over the first opening, and the cover is raisable by pulling a knob attached to the top of the cover proximal to an edge of the lid.

In some aspects, the handle is vertically attached to the side of the pan and turns horizontally above the top of the pan. When a pan is not tall enough to extend above the vertical slits in the burn guards, the handle can be vertically attached to the pan and then turn to be placeable in the vertical slits.

In some aspects, the stirrer comprises a stirring handle, a shaft perpendicularly attached to the bottom of the stirring handle, and at least one blade connected to the shaft. In some aspects, the shaft turns to a horizontal position and then again to a vertical position and passes through a second opening in the center of the lid. In some aspects, when the lid is attached to the pan, the shaft extends downward in the pan to proximal a bottom of the pan, and the at least one blade is connected to a section of the shaft within the pan. In some aspects, the at least one blade comprises one to three blades. In some aspects, the at least one blade comprises two blades. In some aspects, the two blades comprise a) a first blade closest to the stirring handle and b) a second blade below the first blade. In some aspects, a first straight side of the first blade is vertically attached to the shaft and extends at least 50% the radius of the pan. In some aspects, second blade is vertically attached to the shaft and extends at least 75% of a diameter of the pan. In some aspects, the second blade is proximal to a bottom of the pan when the lid is attached to the pan.

In some aspects, the stirrer is removably attached to the lid. In some aspects, the staff is separable on the vertical section above the at least one blade. In some aspects, a connector is located above the at least one blade. In some aspects the connector is usable to removably attach the at least one blade from a section of the shaft connected to the stirring handle. In some aspects, the stirrer is permanently attached to the lid. In some aspects, the saucepan further comprises a conical stabilizer. In some aspects, the conical stabilizer is perpendicularly attachable to a top of the lid with the largest diameter section proximal to the lid, and the staff passes vertically through the center of the conical stabilizer.

In some aspects, the at least one piece of cookware comprises a fry wok. In some aspects, the fry wok comprises a wok, the handle attached to a side of the wok, and a lid removably attachable to an open top of the wok. In some aspects, the lid comprises a wire mesh. In some aspects, the wire mesh comprises an opening and the opening is capable of receiving a utensil while the wire mesh is attached to the wok.

In some aspects, the handle is vertically attached to the side of the wok and turns horizontally above the top of the wok. When a wok is not tall enough to extend above the vertical slits in the burn guards, the handle can be vertically attached to the pan and then turn to be placeable in the vertical slits.

In some aspects, the safe cooking system further comprises a spatula. In some aspects, the spatula comprises a handgrip, a shaft, an attachment zone, a connector, and a blade. In some aspects the handgrip attaches to the shaft distal to the attachment zone, the attachment zone attaches to the connector distal to the blade, and the shaft and the blade are parallel offset. In some aspects, the spatula further comprises an activator and a turning mechanism. In some aspects, the activator connects to the shaft below the handgrip. In some aspects, the turning mechanism rotates the blade by approximately 90 degrees when the activator is moved toward the handgrip and in the oppositive 90 degrees when the activator is moved away from the handgrip. In some aspects, the spatula blade is insertable below an opening in a lid of the at least one piece of cookware. In some aspects, when the blade is inserted below the lid, the blade is rotatable by the 90 degrees without coming into contact with the lid.

In yet another embodiment, the present disclosure provides a safe cooking system. The safe cooking system comprises a) a cooktop comprising a cooking eye, a cooling eye, and an electric power cord; b) a first controller and a second controller, each capable of operating the cooking eye when the electric power cord is plugged into an outlet; c) a first burn guard attachable around the cooking eye and a second burn guard attachable around the cooling eye; d) vertical slits beginning at the top of the first burn guard and at the top of the second burn guard; and e) at least one piece of cookware comprising a handle. The cooking eye and the cooling eye are attached to the top of the cooktop, and the first controller and the second controller are each attached to the cooktop proximal the cooking eye. The first controller is usable to set a heat intensity of the cooking eye, and the second controller is usable to set a time period of the heat intensity The first burn guard and the second burn guard each form an open cylindrical tube. The at least one piece of cookware is placeable on either the cooking eye or the cooling eye. The handle can be simultaneously placed in the first vertical slit of the first burn guard and the second vertical slit of the second burn guard when the first burn guard and the second burn guard are attached to the cooktop and the piece of cookware is placed on either the cooking eye or the cooling eye. The electric power cord is attached to a side or the back of the cooktop.

It is to be understood that the various aspects of the cooktop, the cooking eye, the circuit completer, the various controllers, a portable cooktop and a cooktop attached to a structure, and the first and second burn guards described herein above apply to the present embodiment as well.

In yet another embodiment, the present disclosure provides a conversion kit for converting a commercial stovetop into a safe-cooking stovetop. The conversion kit comprises a) a cooling eye conversion unit placeable on a converted eye of the stovetop, b) a first burn guard attachable around a cooking eye and a second burn guard attachable around the converted eye, c) a control panel attachable to the stovetop, and at least one piece of cookware comprising a handle. The cooling eye conversion kit comprises a housing with a support plate on top of the housing, a motorized fan within the housing, and at least three support legs elevating the housing above the converted eye. The first burn guard and the second burn guard each form an open cylindrical tube. A first vertical slit begins at the top of the first burn guard and a second vertical slit begins at the top of the second burn guard. The at least one piece of cookware is placeable on either the cooking eye or the cooling eye conversion unit. The handle can be simultaneously placed in the first vertical slit of the first burn guard and the second vertical slit of the second burn guard when the first burn guard and the second burn guard are attached to the cooktop and the piece of cookware is placed on either the cooking eye or the cooling eye conversion unit. The control panel comprises a timer with an audible alarm. When the control panel is attached to the stovetop, the control panel is capable of blocking access to a stovetop controller for the converted eye.

In some aspects, the fan is controlled by an independent power source. In some aspects, a power cord is electronically connected to the fan, causing the fan to rotate when power is flowing. In some aspects the power cord has a USB plug distal to the fan. In some aspects, the independent power source comprises a battery, an outlet into which the plug can be inserted, and a switch capable of activating the fan when the plug is inserted into the outlet. In some aspects the battery is rechargeable. In some aspects, the battery is disposable.

In some aspects, the control panel further comprises an electric power cord. In some aspects, the electric power cord comprises a cord, a plug, and has an interceptor connected to the plug. In some aspects, when the electric power cord is plugged into an outlet the electric power cord is electronically connected to the timer, a switch capable of activating the fan, and an interceptor. In some aspects, when the electric power cord is plugged into the outlet and the timer is in an off position, power does not go to the stovetop.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed:

1. A safe-cooking cooktop comprising: a cooking eye, a cooling eye, a circuit completer, a first controller, a second controller, a first burn guard, and a second burn guard, wherein the cooking eye and the cooling eye are attached to a top of the cooktop, wherein when the circuit completer is activated, the circuit completer is usable to enable the first controller and the second controller, wherein the first controller is usable to set a heat intensity of the cooking eye, and the second controller is usable to set a time period of the heat intensity, wherein the first controller and the second controller are attached to the cooktop proximal to the cooking eye, wherein the first burn guard and the second burn guard each form an open cylindrical tube, wherein the first burn guard is attachable to the cooktop around the cooking eye and the second burn guard is attachable to the cooktop around the cooling eye, wherein each of the first burn guard and the second burn guard comprises a vertical slit starting from a top and ending around half way down each of the first burn guard and the second burn guard, and wherein a handle can simultaneously pass through the first burn guard vertical slit and the second burn guard vertical slit when a piece of cookware attached to the handle is located on the cooking eye or the cooling eye.

2. The cooktop of claim 1, wherein the cooking eye comprises an electric coil burner, wherein the cooling eye comprises an open support plate, wherein the cooktop further comprises a fan below the cooling eye and a third controller, wherein when the circuit completer is activated, the circuit completer is usable to enable the third controller, wherein the third controller is usable to activate the fan, wherein the third controller is attached to cooktop proximal to the cooling eye, and wherein the fan causes ambient to air flow from below the cooling eye and through the open support plate when the fan is activated.

3. The cooktop of claim 1, wherein the circuit completer comprises an electric power cord, wherein the circuit completer is activated when the electric power cord is plugged into an outlet, and wherein the electric power cord is attached to a side or a back of the cooktop; and/or wherein the circuit completer comprises a switch, wherein the circuit completer is activated when the switch is placed in an on position, and wherein the switch is proximal to the cooktop.

4. The cooktop of claim 1, wherein the cooktop is portable.

5. The cooktop of claim 1, wherein the piece of cookware is selected from the group consisting of a deep cooking pot, a saucepan, or a fry wok.

6. A safe cooking system comprising:

a) a cooktop comprising a cooking eye, a cooling eye, and a circuit completer;

b) at least one controller capable of operating the cooking eye and/or the cooling eye when the circuit completer is activated;

c) a first burn guard attachable around the cooking eye and a second burn guard attachable around the cooling eye;

d) vertical slits beginning at a top of the first burn guard and at a top of the second burn guard; and e) at least one piece of cookware comprising a handle, wherein the cooking eye and the cooling eye are attached to a top of the cooktop, and the at least one controller is attached to the cooktop proximal the cooking eye and/or the cooling eye, wherein the first burn guard and the second burn guard each form an open cylindrical tube, wherein the at least one piece of cookware is placeable on either the cooking eye or the cooling eye, and wherein the handle is simultaneously placeable in the first vertical slit of the first burn guard and the second vertical slit of the second burn guard when the first burn guard and the second burn guard are attached to the cooktop and the at least one piece of cookware is placed on either the cooking eye or the cooling eye.

7. The safe cooking system of claim 6, wherein the cooking eye comprises an electric coil burner and the cooling eye comprises an open support plate, wherein the at least one controller comprises a first controller usable to set a heat intensity of the cooking eye and a second controller usable to set a time period of the heat intensity, wherein the first controller and the second controller are attached proximal to the cooking eye, and wherein the cooktop further comprises a fan below the cooling eye and the at least one controller further comprise a third controller usable to activate the fan, wherein the third controller is attached to the cooktop proximal to the cooling eye, and wherein the fan causes ambient to air to flow from below the cooling eye and through the open support plate when the fan is activated.

8. The safe cooking system of claim 6, wherein the circuit completer comprises an electric power cord, wherein the circuit completer is activated when the electric power cord is plugged into an outlet, and wherein the electric power cord is attached to a side or a back of the cooktop; and/or wherein the circuit completer comprises a switch, wherein the circuit completer is activated when the switch is placed in an on position, and wherein the switch is proximal to the cooktop.

9. The safe cooking system of claim 6, wherein the cooktop is portable.

10. The safe cooking system of claim 6, wherein the cooktop is contained within a structure, wherein the structure is selected from the group consisting of a shelf, a cabinet, a cart, a multi-use appliance, or a kitchen countertop.

11. The safe cooking system of claim 6, wherein the at least one piece of cookware is selected from the group consisting of a deep cooking pot, a saucepan, or a fry wok.

12. The safe cooking system of claim 6, wherein the at least one piece of cookware comprises a deep cooking pot, wherein the deep cooking pot comprises the handle attached to a side of the deep cooking pot, a lid removably attachable to an open top of the deep cooking pot, and a stirrer attachable to the lid, wherein the lid further comprises a first opening, wherein a cover sits over the first opening, wherein the cover is raisable by pulling a knob attached to the top of the cover proximal to an edge of the lid, wherein the stirrer comprises a stirring handle, a shaft perpendicularly attached to a bottom of the stirring handle, and at least one blade connected to the shaft, wherein below the stirring handle, the shaft turns to a horizontal position and then again to a vertical position and passes through a second opening in a center of the lid, wherein when the lid is attached to the deep cooking pot, the shaft extends downward into the deep cooking pot to proximal a bottom of the deep cooking pot, and the at least one blade is connected to a section of the shaft within the deep cooking pot, and wherein the stirrer is removably attachable to the lid.

13. The safe cooking system of claim 12, wherein the at least one blade comprises three blades, wherein the three blades comprise:

a) a first blade closest a bottom side of the lid;

b) a second blade below the first blade; and c) a third blade below the second blade, wherein a first straight side of the first blade is vertically attached to the shaft and extends at least 50% of a radius of the deep cooking pot, wherein a second straight side of the second blade is vertically attached to the shaft on an opposite side of the first blade and extends at least 50% of the radius of the deep cooking pot, and wherein the third blade is vertically attached to the shaft at its middle and the third blade extends at least 75% of a diameter of the deep cooking pot.

14. The safe cooking system of claim 6, wherein the at least one piece of cookware comprises a saucepan, wherein the saucepan comprises a pan, the handle attached to a side of the pan, a lid removably attachable to an open top of the pan, and a stirrer attachable to the lid, wherein the lid further comprises a first opening, wherein a cover sits over the first opening, wherein the cover is raisable by pulling a knob attached to the top of the cover proximal to an edge of the lid, wherein the handle is vertically attached to the side of the pan and turns horizontally above the top of the pan, wherein the stirrer comprises a stirring handle, a shaft perpendicularly attached to a bottom of the stirring handle, and at least one blade connected to the shaft, wherein below the stirring handle, the shaft turns to a horizontal position and then again to a vertical position and passes through a second opening in a center of the lid, wherein when the lid is attached to the pan, the shaft extends downward in the pan to proximal a bottom of the pan, and the at least one blade is connected to a section of the shaft within the pan, wherein the saucepan further comprises a conical stabilizer, wherein the conical stabilizer is perpendicularly attachable to a top of the lid with a largest diameter section of the conical stabilizer proximal to the lid, and wherein the shaft passes vertically through a center of the conical stabilizer.

15. The safe cooking system of claim 14, wherein the at least one blade comprises two blades, the two blades comprising:

a) a first blade closest to the handle; and b) a second blade below the first blade, wherein a first straight side of the first blade is vertically attached to the shaft and extends at least 50% of a radius of the pan, and wherein a second straight side of the second blade is vertically attached to the shaft on a opposite side of the first blade extends at least 75% of a radius of the pan.

16. The safe cooking system of claim 6, wherein the at least one piece of cookware comprises a fry wok, wherein the fry wok comprises the handle attached to a side of the fry wok, and a lid removably attachable to an open top of the fry wok, wherein the lid comprises a wire mesh, wherein the wire mesh comprises an opening, wherein the opening is capable of receiving a utensil while the wire mesh is attached to the fry wok, and the handle is vertically attached to the side of the fry wok and turns horizontally above a top of the fry wok.

17. The safe cooking system of claim 6, further comprising a spatula, wherein the spatula comprises a handgrip, a shaft, an attachment zone, a connector, and a blade, wherein the handgrip attaches to the shaft distal to the attachment zone, wherein the attachment zone attaches to the connector distal to the blade, wherein the shaft and the blade are parallel offset, wherein the spatula further comprises an activator and a turning mechanism, wherein the activator connects to the shaft below the handgrip, wherein the turning mechanism rotates the blade by approximately 90 degrees when the activator is moved toward the handgrip and in an oppositive 90 degrees when the activator is moved away from the handgrip, wherein the blade is insertable below an opening in a lid for the at least one piece of cookware, and wherein when the blade is inserted below the lid, the blade is rotatable by the 90 degrees without coming into contact with the lid.

* * * * *